US012795627B2

(12) United States Patent
Han et al.

(10) Patent No.: US 12,795,627 B2
(45) Date of Patent: Nov. 10, 2026

(54) RESOURCE ALLOCATION METHOD, APPARATUS, AND SYSTEM

(71) Applicant: HUAWEI TECHNOLOGIES CO., LTD., Shenzhen (CN)

(72) Inventors: Feng Han, Chengdu (CN); Long Yu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/423,582

(22) Filed: Jan. 26, 2024

(65) Prior Publication Data

US 2024/0196383 A1 Jun. 13, 2024

Related U.S. Application Data

(63) Continuation of application No. PCT/CN2022/108748, filed on Jul. 28, 2022.

(30) Foreign Application Priority Data

Jul. 31, 2021 (CN) ......................... 202110877188.8

(51) Int. Cl.
*H04W 72/0453* (2023.01)
*H04L 1/00* (2006.01)
(Continued)

(52) U.S. Cl.
CPC ....... *H04W 72/0453* (2013.01); *H04L 1/0038* (2013.01); *H04W 72/0446* (2013.01); *H04W 72/1273* (2013.01)

(58) Field of Classification Search
CPC ......... H04W 72/0453; H04W 72/0446; H04W 72/1273; H04W 72/23; H04W 72/53; H04L 1/0038; H04L 5/0037; H04L 5/0053
See application file for complete search history.

(56) References Cited

U.S. PATENT DOCUMENTS

2014/0233474 A1* 8/2014 Wu ........................ H04L 5/0053 370/329
2018/0139023 A1 5/2018 Li et al.
(Continued)

FOREIGN PATENT DOCUMENTS

CN 110753311 A * 2/2020 .............. H04W 4/06

OTHER PUBLICATIONS

3GPP TS 38.213 V15.6.0 (Jun. 2019), 3rd Generation Partnership Project; Technical Specification Group Radio Access Network; NR; Physical layer procedures for control(Release 15), total 107 pages.

*Primary Examiner* — Yaotang Wang
(74) *Attorney, Agent, or Firm* — Rimon PC

(57) ABSTRACT

This application is applicable to the field of communication technologies. Embodiments of this application provide a resource allocation method, an apparatus, and a non-transitory computer-readable storage medium. The resource allocation method provided in embodiments of this application includes: determining at least two PDCCH resources for at least two terminal devices, where the at least two PDCCH resources are in a one-to-one correspondence with the at least two terminal devices, and respectively sending information to the at least two terminal devices on the at least two PDCCH resources. Furthermore, a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition.

17 Claims, 11 Drawing Sheets

(51) Int. Cl.
*H04W 72/0446* (2023.01)
*H04W 72/1273* (2023.01)

(56) References Cited

U.S. PATENT DOCUMENTS

| | | | | |
|---|---|---|---|---|
| 2018/0227156 | A1* | 8/2018 | Papasakellariou ... | H04B 7/0456 |
| 2020/0021474 | A1* | 1/2020 | Papasakellariou ... | H04B 7/0456 |
| 2023/0247584 | A1* | 8/2023 | Mu ..................... | H04W 68/005<br>455/458 |

* cited by examiner

RESOURCE ALLOCATION METHOD, APPARATUS, AND SYSTEM

CROSS-REFERENCE TO RELATED APPLICATIONS

This application is a continuation of International Application No. PCT/CN2022/108748, filed on Jul. 28, 2022, which claims priority to Chinese Patent Application No. 202110877188.8, filed on Jul. 31, 2021. The disclosures of the aforementioned applications are incorporated herein by reference in these entireties.

TECHNICAL FIELD

This application relates to the field of communication technologies, and in particular, to a resource allocation method, an apparatus, and a system.

BACKGROUND

In a long term evolution (LTE) system or a fifth-generation (5G) system, a terminal device may determine, by performing blind detection on a physical downlink control channel (PDCCH), a PDCCH resource allocated by a network device to the terminal device. The terminal device may perform blind detection on candidate PDCCH resources in a PDCCH candidate set in a sequence. If the detection succeeds, the terminal device may determine the successfully detected PDCCH resource as the PDCCH resource allocated by the network device to the terminal device. The sequence in which the terminal device performs blind detection on the PDCCH candidate set may be referred to as a blind detection sequence.

In a current solution, the network device sequentially allocates PDCCH resources to the terminal device in the blind detection sequence, starting from a start position of the blind detection, and determines, based on an aggregation level of the terminal device, a quantity of PDCCH resources to be allocated to the terminal device. However, in some scenarios, PDCCH resource fragmentation is prone to occur using this solution.

Therefore, how to optimize the current PDCCH resource allocation method, to reduce a probability of PDCCH resource fragmentation and improve a success rate of PDCCH resource allocation is a problem to be urgently resolved.

SUMMARY

Embodiments of this application provide a resource allocation method, an apparatus, and a system, to resolve a problem that PDCCH resource fragmentation is prone to occur during PDCCH resource allocation.

To achieve the foregoing objective, the following technical solutions are used in embodiments of this application.

According to a first aspect, a resource allocation method is provided. A communication apparatus for performing the method may be a network device, or may be a module applied to a network device, for example, a chip. The following uses an example in which an entity for executing the technical solutions is the network device for description. The network device determines at least two PDCCH resources for at least two terminal devices, where the at least two PDCCH resources are in a one-to-one correspondence with the at least two terminal devices, and a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition. Then, the network device respectively sends information to the at least two terminal devices on the at least two PDCCH resources. Based on the resource allocation method provided in embodiments of this application, the frequency domain position of the PDCCH resource allocated by the network device to the terminal device can meet the preset condition, so that frequency domain position distribution of the PDCCH resources is no longer randomized, and a probability of a problem of PDCCH resource fragmentation is reduced.

With reference to the first aspect, in a possible implementation, that a distance between a frequency domain position of each of the at least two PDCCH resources and a reference frequency domain position meets a preset condition includes: Each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,$$

where L represents an aggregation level of a terminal device corresponding to the one or more candidate PDCCH resources;

$$Y_{p,n^{\mu}_{s,f}}$$

represents a randomization parameter corresponding to the terminal device; $N_{CCE,p}$ represents a quantity of control channel element (CCE) resources included in a PDCCH time-frequency resource range indicated by a control resource set of which an index is p, and the control resource set of which the index is p is a control resource set configured by the network device for the terminal device;

$$M^{(L)}_{s,max}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0,1,\ldots,M^{(L)}_{s,max}-1\};$$

$n_{CI}$ represents an index of a cell accessed by the terminal device; and i={0, 1, . . . , L−1}. Based on the resource allocation method provided in embodiments of this application, a candidate PDCCH resource of which a frequency domain position is close to the reference frequency domain position may be preferentially selected from candidate PDCCH resources of the terminal device to be allocated to the terminal device, so that PDCCH resources allocated to a plurality of terminal devices are more centralized. In this way, a PDCCH resource is successfully allocated to a terminal device with a high aggregation level, and a problem that when a frequency domain position of the $1^{st}$ candidate PDCCH resource is related only to the randomization parameter, PDCCH resource fragmentation is prone to occur during PDCCH resource allocation, and as a result the PDCCH resource cannot be allocated to the terminal device with the high aggregation level is avoided.

With reference to the first aspect, in a possible implementation, that each of the at least two PDCCH resources is a PDCCH resource, in an allocatable state, that has a minimum distance between a frequency domain position and the reference frequency domain position and that is in one or more candidate PDCCH resources that satisfy a first formula includes: When a PDCCH resource that has a minimum distance between a frequency domain position and the reference frequency domain position in the one or more candidate PDCCH resources that satisfy the first formula is occupied, each of the at least two PDCCH resources is a PDCCH resource of which an index satisfies a second formula, where the second formula satisfies the following relationship:

$$m_{s.n_{CI},i} = (m_{s.n_{CI},i-1} + 1)\mathrm{mod}M_{s,Max}^{(L)};\ m_{s.n_{CI},i} = (m_{s.n_{CI},i-1} - 1)\mathrm{mod}M_{s,Max}^{(L)};$$
$$m_{s.n_{CI},i} = (m_{s.n_{CI},i-1} + (-1)^i i)\mathrm{mod}M_{s,Max}^{(L)};$$
$$\text{or } m_{s.n_{CI},i} = (m_{s.n_{CI},i-1} - (-1)^i i)\mathrm{mod}M_{s,Max}^{(L)},$$

where $m_{s.n_{CI},i}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1, 2 \ldots , M_{s,Max}^{(L)} - 1\};$$

when i=1, $m_{s.n_{CI},i-1}=m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M_{s,Max}^{(L)}$$

represents the maximum quantity of blind detection times of the terminal device. Based on the resource allocation method provided in embodiments of this application, when the PDCCH resource that has a minimum distance between the frequency domain position and the reference frequency domain position is occupied, the network device may determine the PDCCH resource that is in an allocatable state and has a minimum distance between a frequency domain position and the reference frequency domain position and allocate the PDCCH resource to the terminal device based on the second formula, so that when the PDCCH resource that has a minimum distance between the frequency domain position and the reference frequency domain position is occupied, an effect that the PDCCH resources allocated to a plurality of terminal devices are more centralized can still be implemented.

With reference to the first aspect, in a possible implementation, the reference frequency domain position is determined based on an identifier of a cell accessed by the at least two terminal devices and a third formula; and when the identifier of the cell accessed by the terminal device satisfies the following relationship: (PCI+k)mod n=m, the third formula satisfies the following relationship:

$$N_{CCE,p,m}^{start} = m \times \lfloor N_{CCE,p}/n \rfloor,$$

where PCI represents the identifier of the cell accessed by the terminal device; k is a positive integer greater than or equal to 0; n is a value in $\{1, \ldots, N_{CCE,p}\}$; $N_{CCE,p}$ represents the quantity of CCE resources included in the PDCCH time-frequency resource range indicated by the control resource set of which the index is p, and the control resource set of which the index is p is the control resource set configured by the network device for the terminal device; m is a positive integer, and 0≤m≤n−1; and $$N_{CCE,p,m}^{start}$$

represents an index of a CCE resource corresponding to the reference frequency domain position. Based on the resource allocation method provided in embodiments of this application, terminal devices accessing different cells correspond to different reference frequency domain positions, to reduce inter-cell interference.

With reference to the first aspect, in a possible implementation, that a distance between frequency domain positions of two PDCCH resources that are adjacent in frequency domain in the at least two PDCCH resources meets a preset condition includes: The two adjacent PDCCH resources include a first PDCCH resource and a second PDCCH resource, and the second PDCCH resource is a PDCCH resource, in an allocatable state, that has a minimum distance from the first PDCCH resource and that is in one or more candidate PDCCH resources that satisfy the first formula; and the first formula satisfies the following relationship:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mathrm{mod} \lfloor N_{CCE,p}/L \rfloor \right\} + i,$$

where L represents an aggregation level of a terminal device corresponding to the one or more candidate PDCCH resources;

$$Y_{p,n_{s,f}^{\mu}}$$

represents a randomization parameter corresponding to the terminal device; $N_{CCE,p}$ represents a quantity of CCE resources included in a PDCCH time-frequency resource range indicated by a control resource set of which an index is p, and the control resource set of which the index is p is a control resource set configured by the network device for the terminal device;

$$M_{s,max}^{(L)}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M_{s,max}^{(L)} - 1\};$$

$n_{CI}$ represents an index of a cell accessed by the terminal device; and i={0, 1, . . . , L−1}. Based on the resource allocation method provided in embodiments of this application, a candidate PDCCH resource of which a frequency domain position is closest to another PDCCH resource may be preferentially selected from candidate PDCCH resources of the terminal device to be allocated to the terminal device, so that PDCCH resources allocated to a plurality of terminal devices are more centralized. In this way, a PDCCH resource is successfully allocated to a terminal device with a high aggregation level, and a problem that when a frequency domain position of the 1st candidate PDCCH resource is related only to the randomization parameter, PDCCH resource fragmentation is prone to occur during PDCCH resource allocation, and as a result the PDCCH resource cannot be allocated to the terminal device with the high aggregation level is avoided.

With reference to the first aspect, in a possible implementation, the cell accessed by the at least two terminal devices meets the following condition: in a target periodicity, utilization of the CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, where the first-type terminal device is a terminal device to which a PDCCH resource is unsuccessfully allocated and of which an aggregation level is greater than a second threshold, and the second-type terminal device is a terminal device of which an aggregation level is greater than the second threshold and that requests scheduling. Based on this solution, whether a PDCCH resource fragmentation problem in the cell accessed by the terminal device is serious may be determined based on utilization of a candidate PDCCH resource or a probability that the PDCCH resource fails to be allocated to the terminal device with the high aggregation level. If the preset condition is met, it indicates that the PDCCH resource fragmentation problem is serious, and the resource allocation method provided in embodiments of this application needs to be applied to reduce the probability of the problem of PDCCH resource fragmentation, to further improve a success rate of the PDCCH resource allocation. If the preset condition is not met, it indicates that the problem of PDCCH resource fragmentation is not serious, and the resource allocation method provided in embodiments of this application does not need to be applied.

With reference to the first aspect, in a possible implementation, the target periodicity is determined based on a load status corresponding to the cell accessed by the at least two terminal devices. Based on this solution, different target periodicities and thresholds corresponding to the target periodicities may be determined based on load statuses of the cell in different scenarios, to meet different requirements.

According to a second aspect, a communication apparatus is provided, configured to implement the foregoing method. The communication apparatus includes a corresponding module, unit, or means (means) for implementing the foregoing method. The module, the unit, or the means may be implemented by hardware or software, or implemented by hardware executing corresponding software. The hardware or software includes one or more modules or units corresponding to the foregoing functions.

With reference to the second aspect, in a possible implementation, the communication apparatus includes a processing module and a transceiver module, where the processing module is configured to determine at least two physical downlink control channel PDCCH resources for at least two terminal devices, where the at least two PDCCH resources are in a one-to-one correspondence with the at least two terminal devices, and a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition. The transceiver module is configured to respectively send information to the at least two terminal devices on the at least two PDCCH resources.

With reference to the second aspect, in a possible implementation, that a distance between a frequency domain position of each of the at least two PDCCH resources and a reference frequency domain position meets a preset condition includes: Each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where L represents an aggregation level of a terminal device corresponding to the one or more candidate PDCCH resources;

$$Y_{p,n_{s,f}^{\mu}}$$

represents a randomization parameter corresponding to the terminal device; $N_{CCE,p}$ represents a quantity of control channel element CCE resources included in a PDCCH time-frequency resource range indicated by a control resource set of which an index is p, and the control resource set of which the index is p is a control resource set configured by the communication apparatus for the terminal device;

$$M_{s,max}^{(L)}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M_{s,max}^{(L)} - 1\};$$

$n_{CI}$ represents an index of a cell accessed by the terminal device; and i={0, 1, . . . , L−1}.

With reference to the second aspect, in a possible implementation, that each of the at least two PDCCH resources is a PDCCH resource, in an allocatable state, that has a minimum distance between a frequency domain position and the reference frequency domain position and that is in one or more candidate PDCCH resources that satisfy a first formula includes: When a PDCCH resource that has a minimum distance between a frequency domain position and the reference frequency domain position in the one or more candidate PDCCH resources that satisfy the first formula is occupied, each of the at least two PDCCH resources is a PDCCH resource of which an index satisfies a second formula, where the second formula satisfies the following relationship:

$$m_{s.n_{CI},i} = (m_{s.n_{CI},i-1} + 1) \bmod M_{s,Max}^{(L)}; \; m_{s,n_{CI},i} = (m_{s,n_{CI},i-1} - 1) \bmod M_{s,Max}^{(L)};$$

$$m_{s.n_{CI},i} = (m_{s.n_{CI},i-1} + (-1)^i i) \bmod M_{s,Max}^{(L)};$$

$$\text{or } m_{s.n_{CI},i} = (m_{s.n_{CI},i-1} - (-1)^i i) \bmod M_{s,Max}^{(L)},$$

where $m_{s.n_{CI},i}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1, 2 \ldots, M_{s,Max}^{(L)} - 1\};$$

when i=1, $m_{s.n_{CI},i-1} = m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M_{s,Max}^{(L)}$$

represents the maximum quantity of blind detection times of the terminal device.

With reference to the second aspect, in a possible implementation, the reference frequency domain position is determined based on an identifier of a cell accessed by the at least two terminal devices and a third formula; and when the identifier of the cell accessed by the terminal device satisfies the following relationship: (PCI+k)mod n=m, the third formula satisfies the following relationship:

$$N_{CCE,p,m}^{start} = m \times \lfloor N_{CCE,p}/n \rfloor,$$

where PCI represents the identifier of the cell accessed by the terminal device; k is a positive integer greater than or equal to 0; n is a value in {1, . . . , $N_{CCE,p}$}; $N_{CCE,p}$ represents the quantity of CCE resources included in the PDCCH time-frequency resource range indicated by the control resource set of which the index is p, and the control resource set of which the index is p is the control resource set configured by the communication apparatus for the terminal device; m is a positive integer, and 0≤m≤n−1; and $$N_{CCE,p,m}^{start}$$

represents an index of a CCE resource corresponding to the reference frequency domain position.

With reference to the second aspect, in a possible implementation, that a distance between frequency domain positions of two PDCCH resources that are adjacent in frequency domain in the at least two PDCCH resources meets a preset condition includes: The two adjacent PDCCH resources include a first PDCCH resource and a second PDCCH resource, and the second PDCCH resource is a PDCCH resource, in an allocatable state, that has a minimum distance from the first PDCCH resource and that is in one or more candidate PDCCH resources that satisfy the first formula; and the first formula satisfies the following relationship:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where L represents an aggregation level of a terminal device corresponding to the one or more candidate PDCCH resources;

$$Y_{p,n_{s,f}^{\mu}}$$

represents a randomization parameter corresponding to the terminal device; $N_{CCE,p}$ represents a quantity of CCE resources included in a PDCCH time-frequency resource range indicated by a control resource set of which an index is p, and the control resource set of which the index is p is a control resource set configured by the communication apparatus for the terminal device;

$$M_{s,max}^{(L)}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M_{s,max}^{(L)} - 1\};$$

$n_{CI}$ represents an index of a cell accessed by the terminal device; and i={0, 1, . . . , L−1}.

With reference to the second aspect, in a possible implementation, the cell accessed by the at least two terminal devices meets the following condition: in a target periodicity, utilization of the CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, where the first-type terminal device is a terminal device to which a PDCCH resource is unsuccessfully allocated and of which an aggregation level is greater than a second threshold, and the second-type terminal device is a terminal device of which an aggregation level is greater than the second threshold and that requests scheduling.

With reference to the second aspect, in a possible implementation, the target periodicity is determined based on a load status corresponding to the cell accessed by the at least two terminal devices.

For technical effects achieved in any possible implementation of the second aspect, refer to technical effects achieved in different implementations of the first aspect. Details are not described herein again.

According to a third aspect, a communication apparatus is provided. The communication apparatus includes a processor, and the processor is configured to: be coupled to a memory, and after reading computer instructions stored in the memory, perform the method according to the first aspect based on the instructions.

With reference to the third aspect, in a possible implementation, the communication apparatus further includes a memory, and the memory is configured to store computer instructions.

With reference to the third aspect, in a possible implementation, the communication apparatus further includes a communication interface, and the communication interface is used by the communication apparatus to communicate with another device. For example, the communication interface may be a transceiver, an input/output interface, an interface circuit, an output circuit, an input circuit, a pin, a related circuit, or the like.

With reference to the third aspect, in a possible implementation, the communication apparatus may be a chip or a chip system. When the communication apparatus is a chip system, the communication apparatus may include a chip, or may include a chip and another discrete component.

With reference to the third aspect, in a possible implementation, when the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a fourth aspect, a computer-readable storage medium is provided, and the computer-readable storage medium stores instructions. When the instructions are run on a computer, the computer is enabled to perform the method according to the first aspect.

According to a fifth aspect, a computer program product including instructions is provided. When the computer program product runs on a computer, the computer is enabled to perform the method according to the first aspect.

For technical effects achieved in any possible implementation of the third aspect to the fifth aspect, refer to technical effects achieved in different implementations of the first aspect. Details are not described herein again.

According to a sixth aspect, a communication system is provided, including a network device that performs the method according to the first aspect, and a terminal device that performs the method according to the first aspect.

DESCRIPTION OF EMBODIMENTS

Figure 1:
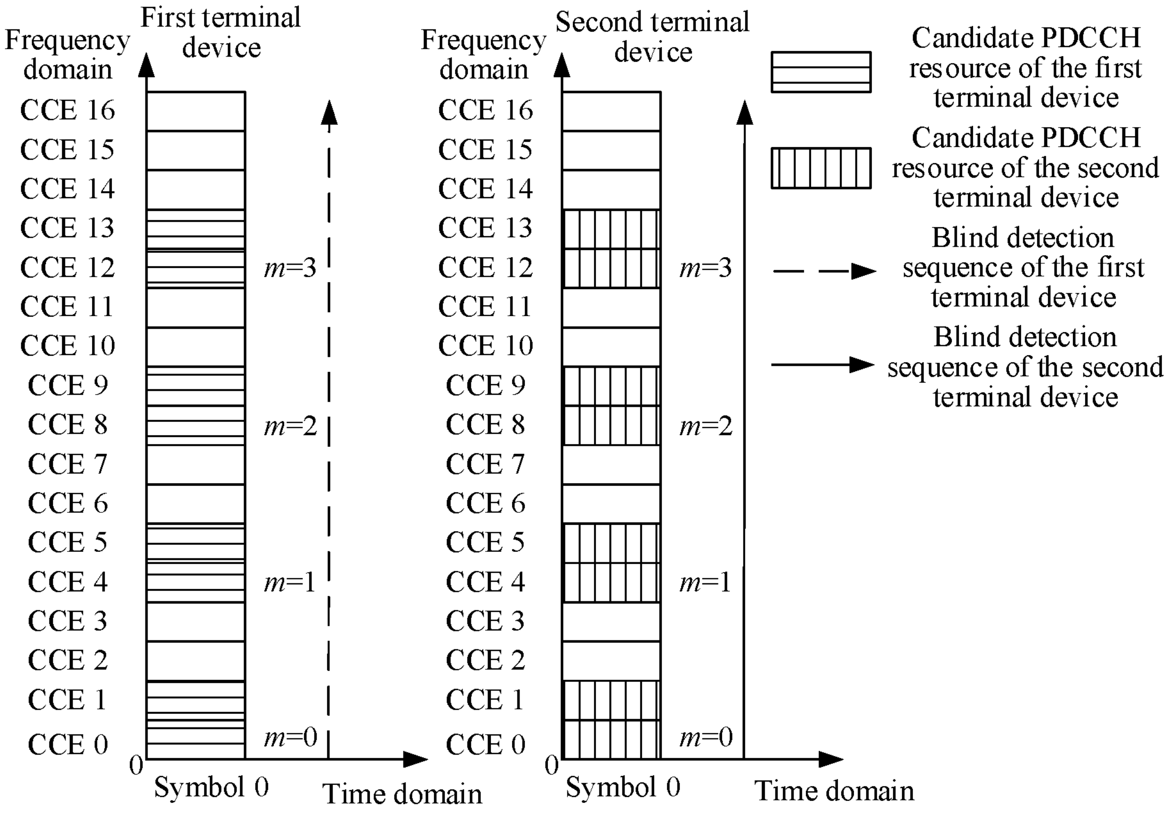
FIG. 1 is a schematic diagram of a candidate physical downlink control channel (PDCCH) resource of a terminal device according to an embodiment of this application.

Before embodiments of this application are described in detail, to facilitate understanding of technical solutions in embodiments of this application, the following first briefly describes technologies related to this application.

1. Blind Detection Procedure of a Physical Downlink Control Channel (PDCCH)

In an LTE system, a new radio (NR) system, or a 5G system, a terminal device needs to determine, through a blind detection procedure, a PDCCH resource allocated by a network device to the terminal device. In the blind detection procedure, the terminal device may determine a PDCCH candidate set based on a blind detection formula, and detect candidate PDCCH resources in the PDCCH candidate set in a blind detection sequence. If the terminal device successfully detects a candidate PDCCH resource, the terminal device may determine the successfully detected PDCCH resource as the PDCCH resource allocated by the network device to the terminal device, and stop the blind detection procedure.

When the network device allocates a PDCCH resource to the terminal device, a unit of the PDCCH resource is a control channel element (CCE) resource, and one candidate PDCCH resource may include one or more candidate CCE resources. The network device determines, based on an aggregation level (AggLvl) of the terminal device, a quantity of candidate CCE resources included in one candidate PDCCH resource.

The following uses the NR system as an example to further describe the blind detection procedure of a PDCCH. In the NR system, before blind detection is performed, the terminal device may obtain, based on a radio resource control (RRC) message from the network device, information encapsulated in a search space and a control resource set (coreset). The terminal may further learn of information such as PDCCH time-frequency resource range information corresponding to the terminal device, a scheduling periodicity, an aggregation level range of the terminal device, and a maximum quantity of blind detection times of the terminal device corresponding to each aggregation level in the aggregation level range of the terminal device. Then, the terminal device may determine, based on the learned information and the blind detection formula, one or more candidate PDCCH resources included in the PDCCH time-frequency resource range indicated by the control resource set, where each candidate PDCCH resource corresponds to one or more candidate CCE resources. Then, the terminal device may sequentially detect, until the detection succeeds, the candidate PDCCH resource in a blind detection sequence associated with an index of the candidate PDCCH resource.

It should be noted that, in the PDCCH time-frequency resource range indicated by one control resource set, candidate PDCCH resources (or candidate CCE resources) have a same time domain position (where both quantities of start symbols in time domain and quantities of occupied symbols in time domain are the same).

In a solution, that an index of the control resource set is p is used as an example, and the blind detection formula satisfies the following relationship:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,\qquad\text{Formula (1)}$$

L represents the aggregation level of the terminal device;

$$Y_{p,n^{\mu}_{s,f}}$$

represents a randomization parameter corresponding to the terminal device; $N_{CCE,p}$ represents a quantity of candidate CCE resources included in a PDCCH time-frequency resource range indicated by the control resource set of which the index is p, and the control resource set of which the index is p is a control resource set configured by the network device for the terminal device;

$$M^{(L)}_{s,max}$$

represents a maximum quantity of blind detection times of the terminal device; $m_{s,n_{CI}}$ represents an index of the candidate PDCCH resource, and $m_{s,n_{CI}}$ is a value in $$\{0, 1, \ldots, M^{(L)}_{s,max}-1\};$$

$n_{CI}$ represents an index of a cell accessed by the terminal device; and i={0, 1, . . . , L−1}.

The following describes how the terminal device determines the foregoing parameters: The terminal device learns of a value range of L based on the information in the search space, and further determines, based on the value range of L and possible values of L, one or more values of L corresponding to the terminal device; and the terminal device needs to determine, separately with reference to the blind detection formula, the candidate PDCCH resource based on each of the one or more values of L corresponding to the terminal device. For example, the terminal device learns that the value range of Z is 4 to 16. Because the possible values of L are {1, 2, 4, 8, 16}, the terminal device may determine that the values of L corresponding to the terminal device include 4, 8, or 16.

$$Y_{p,n^{\mu}_{s,f}}$$

is a pseudo random value determined by the terminal device based on a radio network temporary identifier (RNTI) sent by the network device and a time point at which the RNTI is sent. $N_{CCE,p}$ is a fixed value determined by the terminal device based on the information in the control resource set.

$$M^{(L)}_{s,max}$$

is a value determined by the terminal device based on the information in the search space, where each of the one or more values of L corresponding to the terminal device corresponds to one value of $$M^{(L)}_{s,max}.$$

A maximum value of $m_{s,n_{CI}}$ is determined by the terminal device based on the value of $$M^{(L)}_{s,max}.$$

$n_{CI}$ is determined by the terminal device based on a currently accessed cell. A maximum value of i is determined by the terminal device based on the value of L.

When the network device determines the foregoing parameters, different from determining the foregoing parameters by the terminal device, for one terminal device, the network device determines a fixed aggregation level L. Correspondingly, the maximum quantity $$M^{(L)}_{s,max}$$

of blind detection times of the terminal device determined by the network device is also a fixed value corresponding to the determined aggregation level L. For other parameters, refer to the foregoing descriptions. Details are not described herein again.

To avoid misunderstanding, some operators in the formula (1) are explained herein: a mod b indicates to take a remainder of a divided by b, and [a/b] indicates to round down a/b. Details are not described again.

The terminal device may determine the candidate PDCCH resource based on the blind detection formula. For ease of understanding, with reference to FIG. 1, the following describes how to determine a candidate PDCCH resource based on a blind detection formula in a scenario in which a terminal device determines a candidate PDCCH resource based on one aggregation level value. As shown in FIG. 1 (where m in FIG. 1 is an index $m_{s,n_{CI}}$), it is assumed that a PDCCH time-frequency resource range indicated by a control resource set of which an index is p includes 17 candidate CCE resources in total: a CCE 0 to a CCE 16. The 17 candidate CCE resources are located in a symbol 0 in time domain, and have a same time domain position. A first terminal device performs blind detection on PDCCH resources in the PDCCH time-frequency resource range indicated by the control resource set, where a randomization parameter $$Y_{p,n^{\mu}_{s,f}}$$

of the first terminal device is 0, an aggregation level L is 2, and a maximum quantity $$M^{(L)}_{s,max}$$

of blind detection times corresponding to the aggregation level L=2 is 4, so that based on 4−1=3, an index $m_{s,n_{CI}}$, of a candidate PDCCH resource at a first terminal position may be 0, 1, 2, or 3, and based on 2−1=1, i={0, 1}. An index $n_{CI}$ of a cell accessed by the first terminal device is 0.

The foregoing parameters are substituted into the formula (1). When $m_{s,n_{CI}}=0$, the formula (1) is $$2\cdot\left\{\left(0+\left\lfloor\frac{0\times 17}{2\times 4}\right\rfloor+0\right)\bmod\lfloor 17/2\rfloor\right\}+\{0,1\},$$

and {0, 1} is obtained, so that an index of a candidate CCE resource included in a candidate PDCCH resource of which an index is 0 is {0, 1}. Therefore, the candidate PDCCH resource of which the index is 0 includes the CCE 0 and the CCE 1. The rest may be deduced by analogy. When $m_{s,n_{CI}}=1$, the formula (1) is $$2\cdot\left\{\left(0+\left\lfloor\frac{1\times 17}{2\times 4}\right\rfloor+0\right)\bmod\lfloor 17/2\rfloor\right\}+\{0,1\},$$

and {4, 5} is obtained through calculation. In is other words, a candidate PDCCH resource of which an index is 1 includes the CCE 4 and the CCE 5. When $m_{s,n_{CI}}=2$, {8, 9} is obtained through calculation. When $m_{s,n_{CI}}=3$, {12, 13} is obtained through calculation. Therefore, as shown in FIG. 1, the candidate PDCCH resources on which the first terminal device may perform blind detection include a shadow part of candidate PDCCH resources in a left column: CCE 0+CCE 1 included in the candidate PDCCH resource of which the index $m_{s,n_{CI}}=0$, CCE 4+CCE 5 included in the candidate PDCCH resource of which the index $m_{s,n_{CI}}=1$, CCE 8+CCE 9 included in a candidate PDCCH resource of which an index $m_{s,n_{CI}}=2$, and CCE 12+CCE 13 included in a candidate PDCCH resource of which an index $m_{s,n_{CI}}=3$. When the first terminal device performs blind detection, a blind detection sequence is shown by an arrow next to the left column of candidate PDCCH resources, and corresponds to the indexes of the candidate PDCCH resources: 0 to 1 to 2 to 3. The first terminal device sequentially performs blind detection starting from the candidate PDCCH resource of which the index is 0, and stops the blind detection if the candidate PDCCH resource is successfully detected, or if the detection continuously fails, continues to detect until a candidate PDCCH resource of which an index is 3 is detected.

Figure 2:
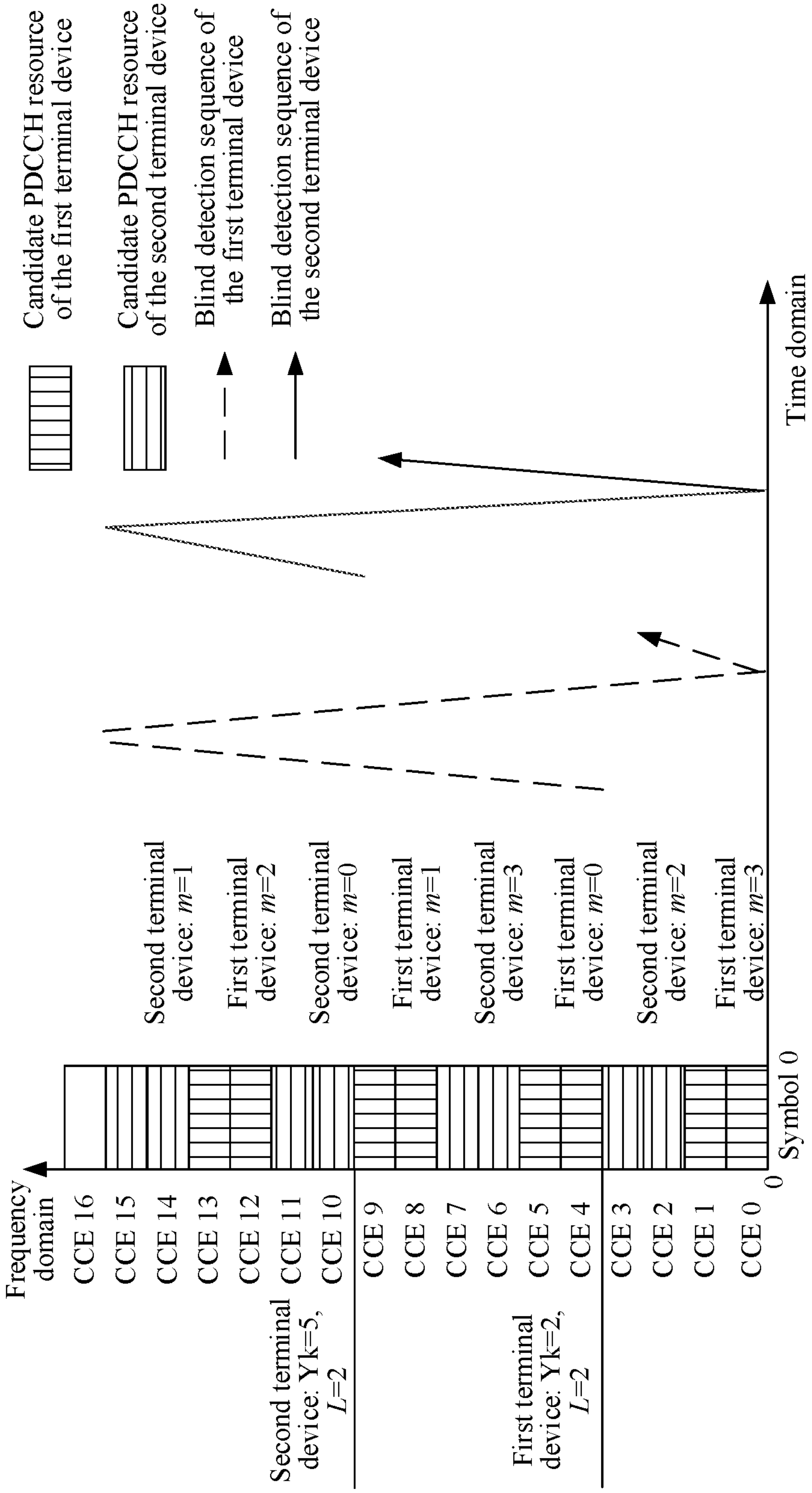
FIG. 2 is a schematic diagram of another candidate PDCCH resource of a terminal device according to an embodiment of this application.

It can be learned from FIG. 1 that because the time domain positions of the candidate PDCCH resources of the terminal device are the same, frequency domain positions of the candidate PDCCH resources are used to distinguish between the candidate PDCCH resources of the terminal device. A randomization parameter is specified in both the LTE system and the NR system, so that distribution of the frequency domain positions of the candidate PDCCH resources of the terminal device is randomized, to avoid PDCCH resource congestion of different terminal devices. For example, if parameters used by a second terminal device and the first terminal device to calculate the formula (1) are consistent, as shown in FIG. 1, candidate PDCCH resources of the first terminal device and the second terminal device are the same. In other words, frequency domain positions of the candidate PDCCH resources of the first terminal device and the second terminal device are the same, and the PDCCH resource congestion may easily occur. After the randomization parameter is introduced, if the randomization parameters are inconsistent, the frequency domain positions of the candidate PDCCH resources are different even if other parameters are consistent. For example, in the foregoing example, if a randomization parameter of the first terminal device is 2, and a randomization parameter of the second terminal device is 5, distribution of the candidate PDCCH resources of the first terminal device and the candidate PDCCH resources of the second terminal device is shown in FIG. 2 (where in FIG. 2, Yk is a randomization parameter $$Y_{p,n^{\mu}_{s,f}},$$

m is an index $m_{s,n_{CI}}$, and L is an aggregation level). It can be learned that the frequency domain positions of the candidate PDCCH resources of the two terminal devices are staggered.

Figure 3:
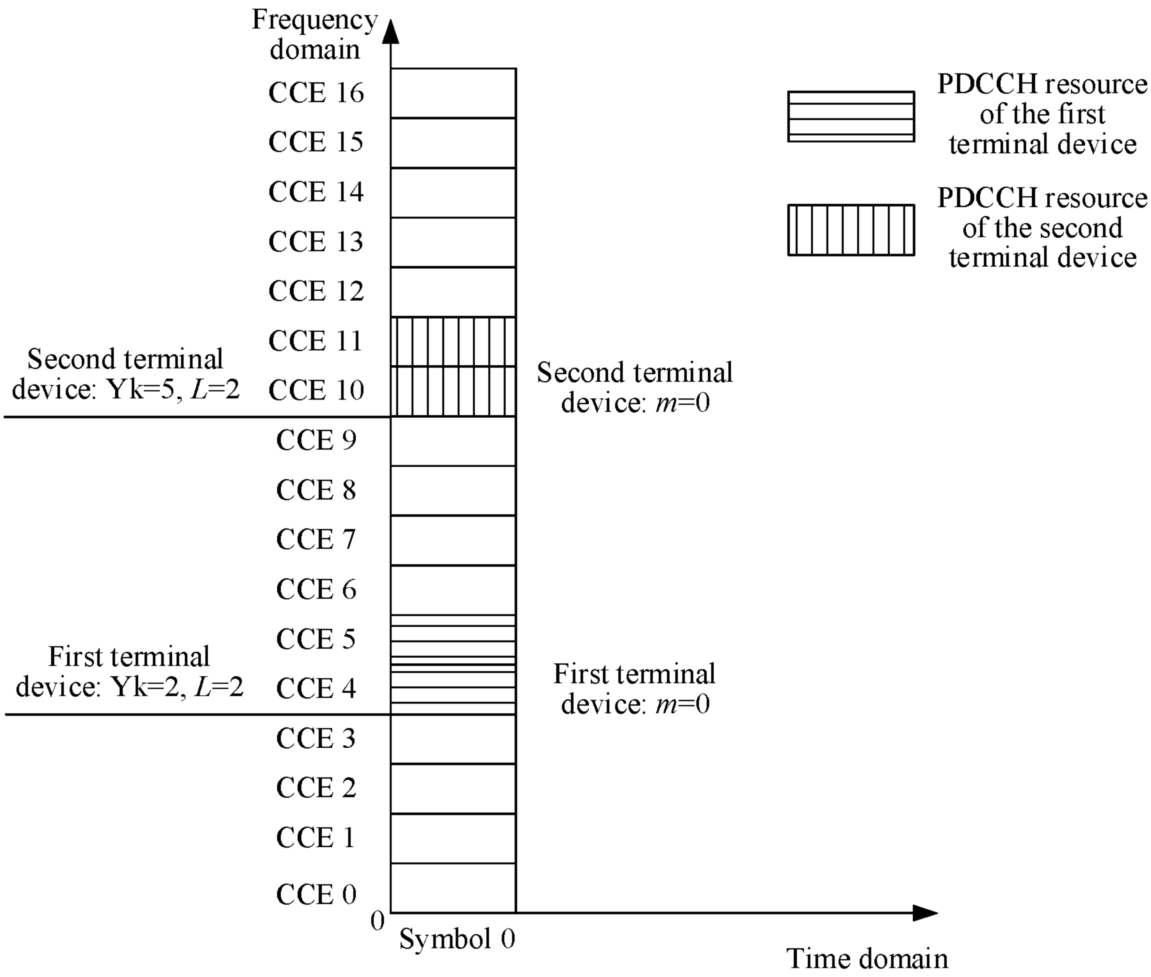
FIG. 3 is a schematic diagram of a PDCCH resource allocation result according to an embodiment of this application.

In addition, when the network device configures the PDCCH resource for the terminal device, the network device determines one fixed aggregation level for the terminal device. The network device determines the candidate PDCCH resources of the terminal device based on the aggregation level corresponding to the terminal device with reference to the blind detection formula, and sequentially allocates the candidate PDCCH resources starting from the candidate PDCCH resource of which the index is 0, where an allocation sequence is the same as the blind detection sequence of the terminal device. If a candidate PDCCH resource is occupied by another terminal device, the network device skips the candidate PDCCH resource, and queries a next candidate PDCCH resource in the blind detection sequence. If the next candidate PDCCH resource is not occupied, the network device allocates the candidate PDCCH resource to the terminal device, or if the next candidate PDCCH resource is still occupied, the network device continues to query another candidate PDCCH resource of the terminal device in the blind detection sequence, until a PDCCH resource is successfully allocated to the terminal device or all candidate PDCCH resources of the terminal device are queried. For example, as shown in FIG. 3 (where in FIG. 3, Yk is a randomization parameter $$Y_{p,n^{\mu}_{s,f}},$$

m is an index $m_{s,n_{CI}}$, and L is an aggregation level), FIG. 3 is a result of allocating, by the network device, PDCCH resources to a first terminal device and a second terminal device. The $1^{st}$ candidate PDCCH resource of the first terminal device includes a CCE 4 and a CCE 5 and is not occupied. The network device determines the CCE 4 and the CCE 5 as the PDCCH resources to be allocated to the first terminal device. The $1^{st}$ candidate PDCCH resource of the second terminal device includes a CCE 10 and a CCE 11 and is not occupied. The network device determines the CCE 10 and the CCE 11 as the PDCCH resources to be allocated to the second terminal device.

It can be learned from the blind detection procedure of the PDCCH and the blind detection formula described above that, when the index of the candidate PDCCH resource is 0, the formula (1) is $$L\cdot\left\{\left(Y_{p,n_{s,f}^{\mu}}+n_{CI}\right)\bmod\lfloor N_{CCE,p}/L\rfloor\right\}+i,$$

and when different terminal devices determine a same control resource set and a same search space, and access a same cell, L, i, $N_{CCE,p}$, and $n_{CI}$ are all fixed values, so that a change of a position of the $1^{st}$ candidate PDCCH resource of each terminal device in frequency domain is related only to the randomization parameter.

Figure 4:
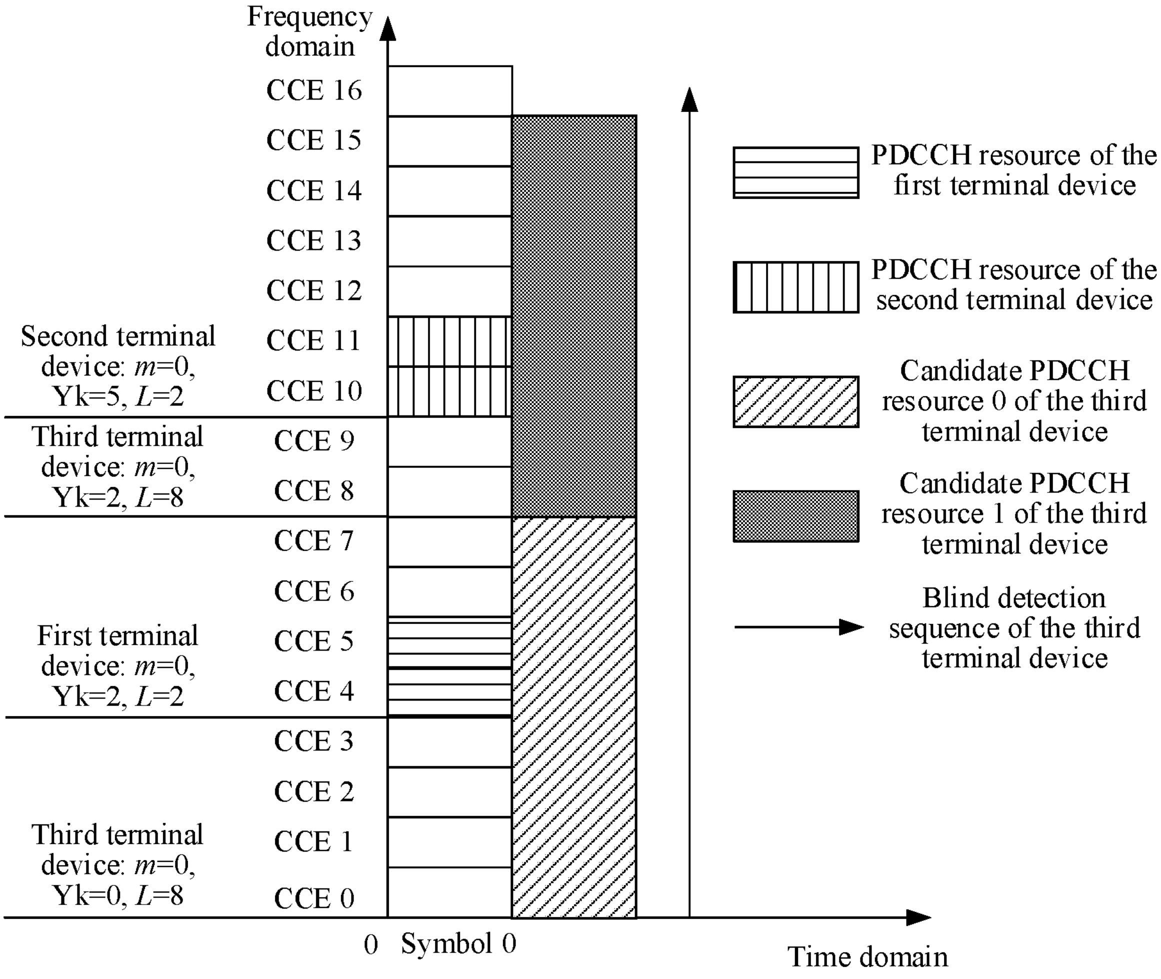
FIG. 4 is a schematic diagram of another PDCCH resource allocation result according to an embodiment of this application.

However, because the randomization parameter is randomized, when the network device allocates PDCCH resources to the terminal device starting from the $1^{st}$ candidate PDCCH resource of the terminal device, the following case may occur: After allocating, based on a start position of blind detection of a terminal device with a low aggregation level, PDCCH resources to the terminal device with the low aggregation level, the network device needs to allocate the PDCCH resources to a terminal device with a high aggregation level. However, because a frequency domain position of the $1^{st}$ candidate PDCCH resource of the terminal device is randomized, the PDCCH resources allocated by the network device to the terminal device with the low aggregation level are distributed in a scattered manner. In this case, the PDCCH resources are divided into a plurality of small resource blocks, and such small resource blocks cannot be allocated to the terminal device that has the high aggregation level and that needs a large quantity of PDCCH resources. As a result, the network device fails to allocate the PDCCH resources to the terminal devices with the high aggregation level. This kind of case may be referred to as a problem of PDCCH resource fragmentation. For example, as shown in FIG. 4 (where in FIG. 4, Yk is a randomization parameter $$Y_{p,n_{s,f}^{\mu}},$$

m is an index $m_{s,n_{CI}}$, and L is an aggregation level), the network device first allocates PDCCH resources to a first terminal device and a second terminal device based on the $1^{st}$ candidate PDCCH resource of the first terminal device and the $1^{st}$ candidate PDCCH resource of the second terminal device. Then, the network device allocates PDCCH resources to a third terminal device of which the aggregation level is 8 and to which eight CCE resources need to be allocated. However, a CCE 4 and a CCE 5 in a candidate PDCCH resource 0 of the third terminal device are already occupied by the first terminal device, and a CCE 10 and a CCE 11 in a candidate PDCCH resource 1 are already occupied by the second terminal device. As a result, the network device cannot allocate the PDCCH resources to the third terminal device.

Therefore, how to optimize the PDCCH resource allocation method in the foregoing conventional technology, to reduce a probability of the problem of PDCCH resource fragmentation and improve a success rate of PDCCH resource allocation is a problem to be urgently resolved currently.

To resolve the foregoing problem, this application provides a resource allocation method, an apparatus, and a system, to reduce the probability of the problem of PDCCH resource fragmentation, and further improve the success rate of PDCCH resource allocation.

The following describes the technical solutions in embodiments of this application with reference to the accompanying drawings in embodiments of this application. In the descriptions of this application, "/" indicates an "or" relationship between associated objects unless otherwise specified. For example, A/B may indicate A or B; and "and/or" in this application is merely an association relationship for describing associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "a plurality of" means two or more. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to describe the technical solutions in embodiments of this application, words such as "first" and "second" in embodiments of this application are used to distinguish between same items or similar items that have basically same functions and effects. A person skilled in the art may understand that the words such as "first" and "second" do not limit a quantity or an execution sequence, and the words such as "first" and "second" do not indicate a definite difference. In addition, in embodiments of this application, words such as "example" or "for example" are used to represent giving an example, an instance, or a description. Any embodiment or design scheme described as an "example" or "for example" in embodiments of this application should not be explained as being more preferred or having more advantages than another embodiment or design scheme. Use of the words "example", "for example", or the like is intended to present a related concept in an example manner for ease of understanding.

In addition, the network architecture and the service scenario described in embodiments of this application are intended to describe the technical solutions in embodiments of this application more clearly, but do not constitute a limitation on the technical solutions provided in embodiments of this application. A person of ordinary skill in the art may know that with evolution of the network architecture and emergence of a new service scenario, the technical solutions provided in embodiments of this application are also applicable to a similar technical problem.

The resource allocation method provided in embodiments of this application may be applicable to various communication systems. For example, the resource allocation method provided in embodiments of this application may be applied to an LTE system, a 5G system, or another future-oriented similar new system. This is not limited in embodiments of this application. In addition, the terms "system" and "network" can be interchanged with each other.

Figure 5:
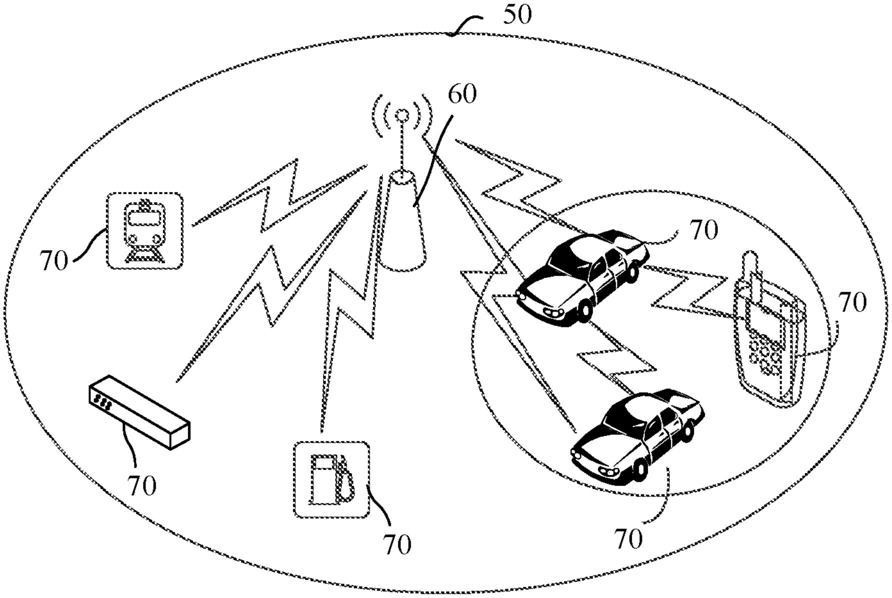
FIG. 5 is a schematic diagram of a structure of a communication system according to an embodiment of this application.

FIG. 5 shows a communication system 50 according to an embodiment of this application. The communication system 50 includes a network device 60 and at least two terminal devices 70 connected to the network device 60. The terminal device 70 is connected to the network device 60 in a wireless manner. Optionally, different terminal devices 70 may communicate with each other. The terminal device 70 may be fixed in a position, or may be movable.

It should be noted that FIG. 5 is merely a schematic diagram. Although not shown, the communication system 50 may further include another network device. For example, the communication system 50 may further include one or more of the following: a core network device, a wireless relay device, and a wireless backhaul device. This is not limited herein. The network device may be connected to the core network device in a wireless or wired manner. The core network device and the network device 60 may be independent different physical devices, a function of the core network device and a logical function of the network device 60 may be integrated into a same physical device, or a part of functions of the core network device and a part of functions of the network device 60 may be integrated into one physical device. This is not limited in embodiments of this application.

For example, as shown in FIG. 5, the network device 60 interacts with the at least two terminal devices 70. In a possible implementation, the network device 60 is configured to determine at least two PDCCH resources for the at least two terminal devices 70, where the at least two PDCCH resources are in a one-to-one correspondence with the at least two terminal devices 70, and a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition. The network device 60 is further configured to respectively send information to the at least two terminal devices on the at least two PDCCH resources. The terminal device 70 is configured to receive the information from the network device 60 on the at least two PDCCH resources. Specific implementation of this solution is described in detail in a subsequent method embodiment, and details are not described herein again.

Optionally, the network device 60 in embodiments of this application is a device for connecting the terminal device 70 to a wireless network, and may be a base station, an evolved NodeB (eNodeB), a transmission reception point (TRP), a next generation NodeB (gNB) in a 5G mobile communication system, a base station in a future mobile communication system, an access node in a wireless-fidelity (Wi-Fi) system, or the like; or may be a module or a unit that implements some functions of the base station, for example, may be a central unit (CU), or may be a distributed unit (DU). A specific technology and a specific device form used by the network device are not limited in embodiments of this application. In this application, unless otherwise specified, the network device means a radio access network device.

Optionally, the terminal device 70 in embodiments of this application may be a device configured to implement a wireless communication function, for example, a terminal or a chip that can be used in a terminal. The terminal may also be referred to as user equipment (UE), a mobile station, a mobile terminal, or the like. The terminal may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form used by the terminal device are not limited in embodiments of this application.

Optionally, the network device 60 and the terminal device 70 in embodiments of this application may be deployed on land, including indoor or outdoor, handheld or in-vehicle; may be deployed on water; or may be deployed on aircraft, a balloon, or a satellite in the air. Application scenarios of the network device 60 and the terminal device 70 are not limited in embodiments of this application.

Optionally, the network device 60 and the terminal device 70 in embodiments of this application may communicate with each other by using a licensed spectrum, may communicate with each other by using an unlicensed spectrum, or may communicate with each other by using both a licensed spectrum and an unlicensed spectrum. The network device 60 and the terminal device 70 may communicate with each other by using a spectrum below 6 gigahertz (GHz), may communicate with each other by using a spectrum above 6 GHz, or may communicate with each other by using both a spectrum below 6 GHz and a spectrum above 6 GHz. Spectrum resources used between the network device 60 and the terminal device 70 are not limited in embodiments of this application.

Optionally, the network device 60 and the terminal device 70 in embodiments of this application may also be referred to as communication apparatuses, and each may be a general-purpose device or a dedicated device. This is not limited in embodiments of this application.

Figure 6:
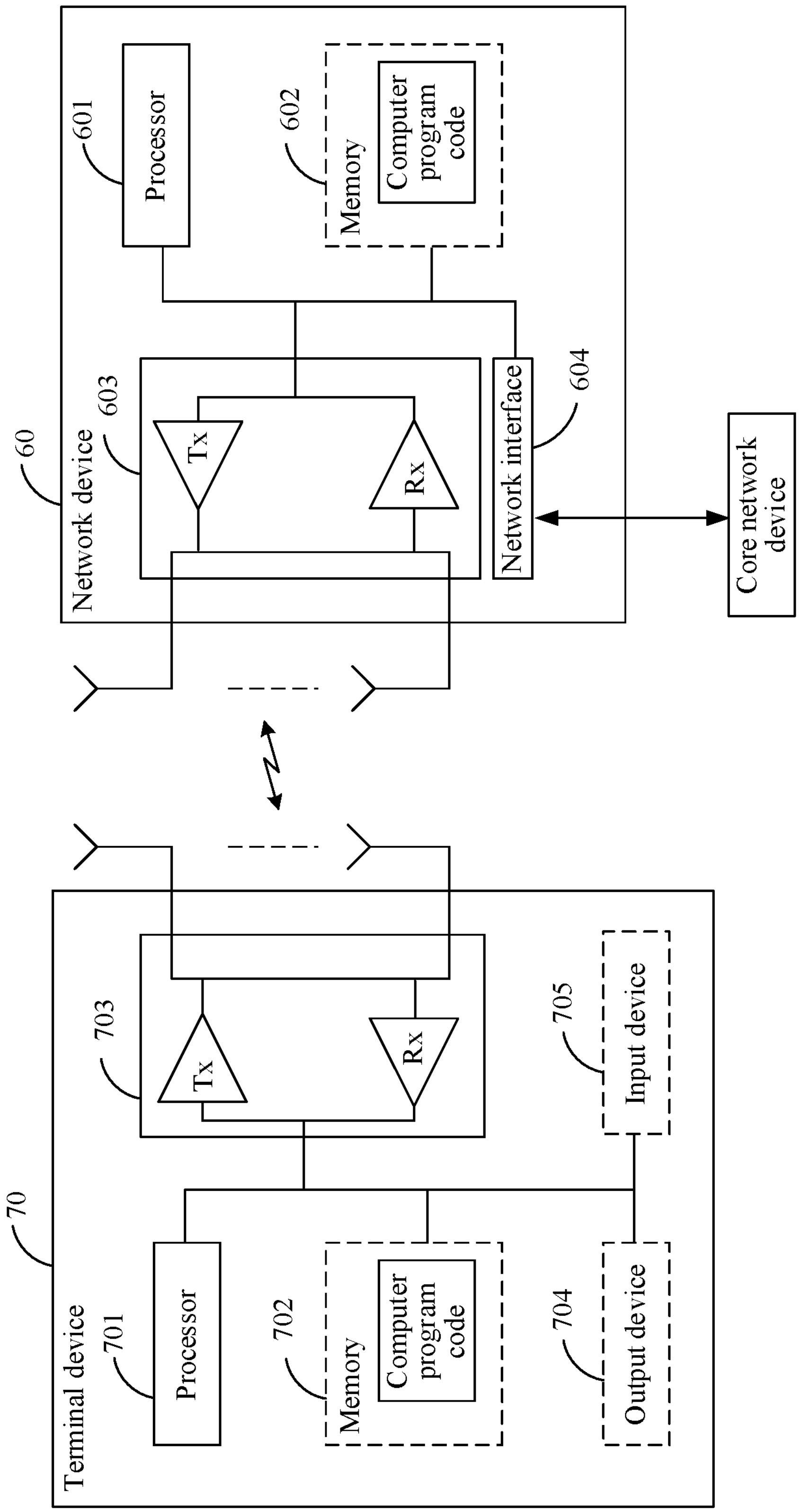
FIG. 6 is a schematic diagram of structures of a network device and a terminal device according to an embodiment of this application.

Optionally, FIG. 6 is a schematic diagram of structures of a network device 60 and a terminal device 70 according to an embodiment of this application.

The terminal device 70 includes at least one processor 701 and at least one transceiver 703. Optionally, the terminal device 70 may further include at least one memory 702, at least one output device 704, or at least one input device 705.

The processor 701, the memory 702, and the transceiver 703 are connected by using a communication line. The communication line may include a path for transferring information between the components described above.

The processor 701 may be a central processing unit (CPU), or may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor, or may be any conventional processor. In an implementation, in an embodiment, the processor 701 may alternatively include a plurality of CPUs, or the processor 701 may be a single-core processor or a multi-core processor. The processor herein may be one or more devices, circuits, or processing cores configured to process data.

The memory 702 may be an apparatus having a storage function. For example, the memory 702 may be a read-only memory (ROM) or another type of static storage device that can store static information and instructions, a random access memory (RAM) or another type of dynamic storage device that can store information and instructions, or may be a programmable read-only memory (PROM), an erasable programmable read-only memory (EPROM), an electrically erasable programmable read-only memory (EEPROM), a compact disc read-only memory (CD-ROM), or another compact disk storage, an optical disk storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer. However, the memory 702 is not limited thereto. The memory 702 may exist independently, and is connected to the processor 701 by using the communication line. The memory 702 may alternatively be integrated with the processor 701.

The memory 702 is configured to store computer-executable instructions for executing the solutions of this application, and the processor 701 controls the execution. Specifically, the processor 701 is configured to execute the computer-executable instructions stored in the memory 702, to implement the resource allocation method in embodiments of this application.

Alternatively, optionally, in embodiments of this application, the processor 701 may perform processing-related functions in the resource allocation method provided in the following embodiments of this application, and the transceiver 703 is responsible for communicating with another device or a communication network. This is not limited in embodiments of this application.

Optionally, the computer-executable instructions in embodiments of this application may also be referred to as application program code or computer program code. This is not limited in embodiments of this application.

The transceiver 703 may use any transceiver-type apparatus, and is configured to communicate with another device or a communication network such as the Ethernet, a radio access network (RAN), or a wireless local area network (WLAN). The transceiver 703 includes a transmitter (Tx) and a receiver (Rx).

The output device 704 communicates with the processor 701, and may display information in a plurality of manners. For example, the output device 704 may be a liquid crystal display (LCD), a light emitting diode (LED) display device, a cathode ray tube (CRT) display device, a projector, or the like.

The input device 705 communicates with the processor 701, and may receive user input in a plurality of manners. For example, the input device 705 may be a mouse, a keyboard, a touchscreen device, a sensor device, or the like.

The network device 60 includes at least one processor 601, at least one transceiver 603, and at least one network interface 604. Optionally, the network device 60 may further include at least one memory 602. The processor 601, the memory 602, the transceiver 603, and the network interface 604 are connected by using a communication line. The network interface 604 is configured to connect to a core network device through a link (for example, an S1 interface), or connect to a network interface of another network device through a wired or wireless link (for example, an X2 interface) (not shown in FIG. 6). This is not limited in embodiments of this application. In addition, for related descriptions of the processor 601, the memory 602, and the transceiver 603, refer to the descriptions of the processor 701, the memory 702, and the transceiver 703 in the terminal device 70. Details are not described herein again.

Figure 7:
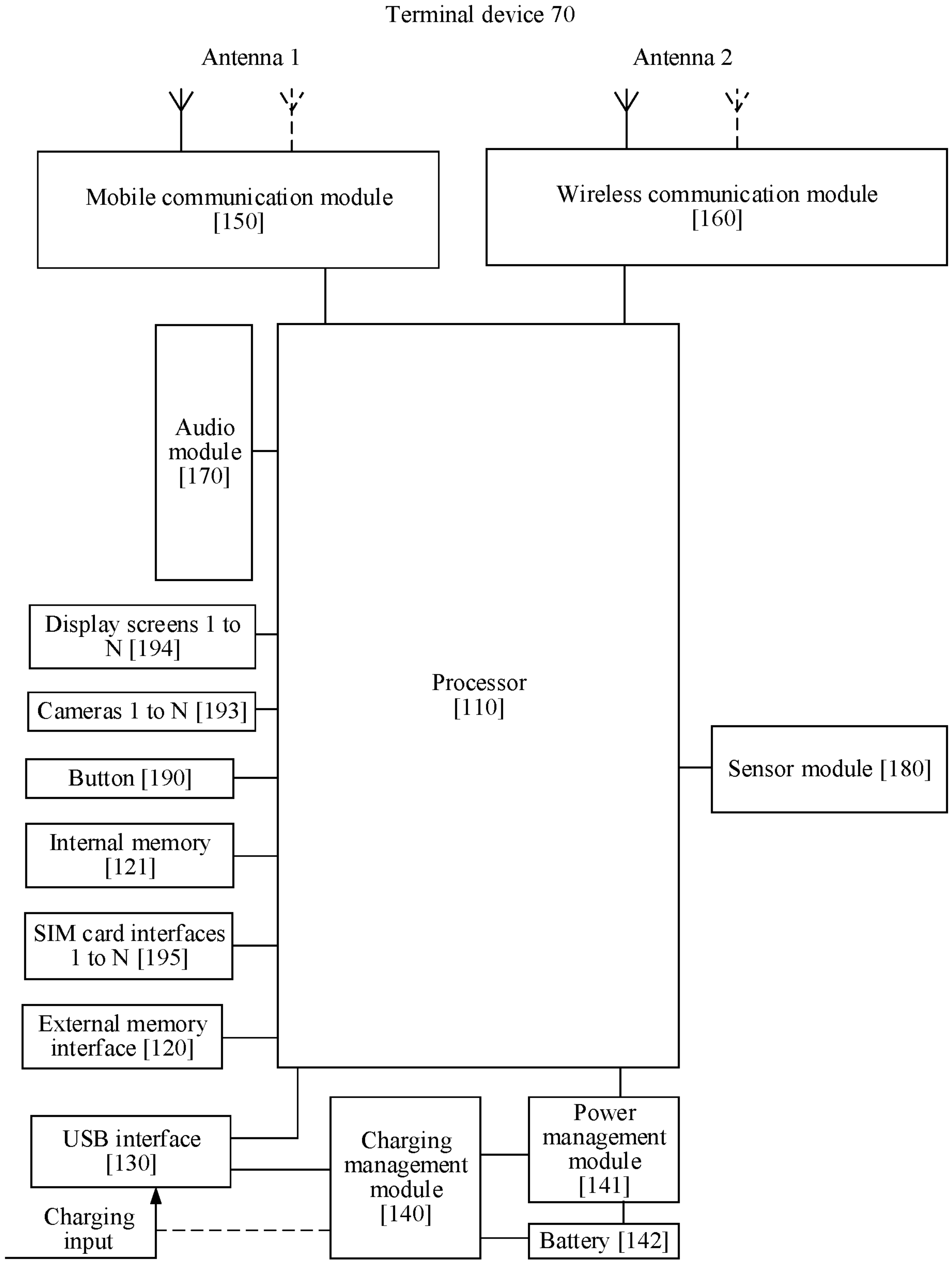
FIG. 7 is a schematic diagram of a structure of another terminal device according to an embodiment of this application.

With reference to the schematic diagram of the structure of the terminal device 70 shown in FIG. 6, for example, FIG. 7 shows an example form of the structure of the terminal device 70 according to an embodiment of this application.

In some embodiments, a function of the processor 701 in FIG. 6 may be implemented by a processor 110 in FIG. 7.

In some embodiments, a function of the transceiver 703 in FIG. 6 may be implemented by an antenna 1, an antenna 2, a mobile communication module 150, a wireless communication module 160, and the like in FIG. 7. The mobile communication module 150 may provide a solution that is applied to the terminal device 70 and that includes a wireless communication technology such as LTE, NR, or future mobile communication. The wireless communication module 160 may provide a solution that is applied to the terminal device 70 and that includes a wireless communication technology such as WLAN (for example, a Wi-Fi network), Bluetooth (BT), a global navigation satellite system (GNSS), frequency modulation (FM), near field communication (NFC), and infrared. In some embodiments, the antenna 1 of the terminal device 70 is coupled to the mobile communication module 150, and the antenna 2 is coupled to the wireless communication module 160, so that the terminal device 70 can communicate with a network and another device through a wireless communication technology.

In some embodiments, a function of the memory 702 in FIG. 6 may be implemented by an internal memory 121, an external memory connected to an external memory interface 120 in FIG. 7, or the like.

In some embodiments, a function of the output device 704 in FIG. 6 may be implemented by a display screen 194 in FIG. 7.

In some embodiments, a function of the input device 705 in FIG. 6 may be implemented by a mouse, a keyboard, a touchscreen device, or a sensor module 180 in FIG. 7.

In some embodiments, as shown in FIG. 7, the terminal device 70 may further include one or more of the following: an audio module 170, a camera 193, a button 190, a SIM card interface 195, a USB interface 130, a charging management module 140, a power management module 141, and a battery 142.

The structure shown in FIG. 7 does not constitute a limitation on the terminal device 70. For example, in some other embodiments of this application, the terminal device 70 may include additional or fewer components than those shown in the figure, or combine some components, or split some components, or have different component arrangements. The components shown in the figure may be implemented in hardware, software, or a combination of software and hardware.

With reference to FIG. 1 to FIG. 7, the following describes a resource allocation method provided in embodiments of this application in detail by using an example in which the network device 60 interacts with the at least two terminal devices 70 in FIG. 5.

Figure 8:
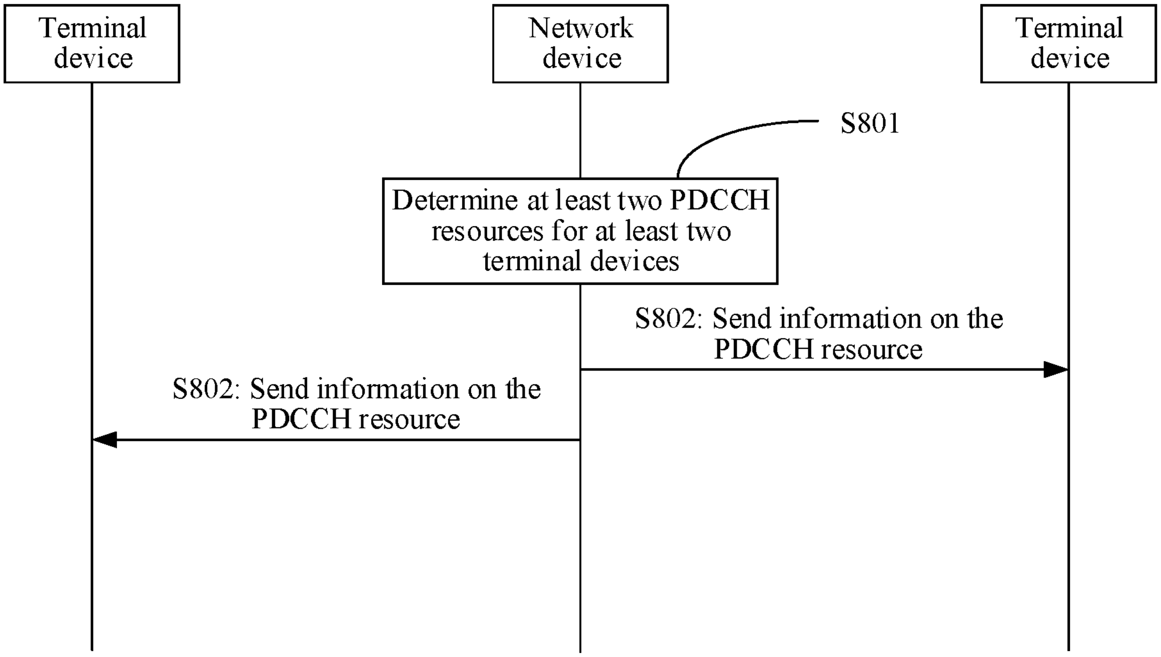
FIG. 8 is a schematic diagram of interaction of a resource allocation method according to an embodiment of this application.

FIG. 8 shows a resource allocation method according to an embodiment of this application, and the resource allocation method includes the following steps S801 and S802.

S801: A network device determines at least two physical downlink control channel PDCCH resources for at least two terminal devices, where the at least two PDCCH resources are in a one-to-one correspondence with the at least two terminal devices, and a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition.

S802: The network device respectively sends information to the at least two terminal devices on the at least two PDCCH resources. Correspondingly, the terminal device receives the information from the network device on the at least two PDCCH resources.

It should be noted that FIG. 8 is merely a schematic diagram. Although not shown, the network device in FIG. 8 may further interact with more than two terminal devices to implement the foregoing steps S801 and S802.

The following describes step S801 in two embodiments.

Embodiment 1: The following describes the embodiment 1 by using an example in which the network device interacts with any terminal device of the at least two terminal devices. When the network device allocates a PDCCH resource to the terminal device, the determined PDCCH resource needs to meet the following condition: A distance between a frequency domain position of the PDCCH resource and a reference frequency domain position meets a preset condition. Therefore, in the resource allocation method provided in embodiments of this application, the distance between the frequency domain position of the PDCCH resource allocated by the network device to the terminal device and the reference frequency domain position can meet the preset condition, so that frequency domain position distribution of the PDCCH resources is no longer randomized, and a probability of a problem of PDCCH resource fragmentation is reduced.

In a possible implementation, in embodiments of this application, that a distance between a frequency domain position of the PDCCH resource and a reference frequency domain position meets a preset condition includes:

The PDCCH resource is a PDCCH resource, in an allocatable state, that has a minimum distance between a frequency domain position and the reference frequency domain position and that is in one or more candidate PDCCH resources that meet a first formula. The one or more candidate PDCCH resources are in a PDCCH time-frequency resource range indicated by a control resource set configured by the network device for the terminal device, and the terminal device performs blind detection on the candidate PDCCH resource in the PDCCH time-frequency resource range indicated by the control resource set.

For related descriptions of the first formula and how to determine the candidate PDCCH resource of the terminal device based on the first formula, refer to the foregoing descriptions of the formula (1). Details are not described herein again.

In embodiments of this application, that the candidate PDCCH resource is in an allocatable state means that one or more CCE resources included in the candidate PDCCH resource are not allocated to another terminal device.

In embodiments of this application, a frequency domain position of the candidate PDCCH resource includes a frequency domain position corresponding to any point in a frequency domain segment occupied by the candidate PDCCH resource, for example, a frequency domain position of one end of two ends or a frequency domain position of a middle point. This is not limited in embodiments of this application. However, it should be noted that different candidate PDCCH resources have a same definition of frequency domain positions. For example, the frequency domain positions of the different candidate PDCCH resources are frequency domain positions of middle points in frequency domain or are frequency domain positions of end points in frequency domain.

In embodiments of this application, for a PDCCH time-frequency resource range indicated by one control resource set, a reference frequency domain position is determined. Therefore, the network device may select, based on a distance between a frequency domain position of each candidate PDCCH resource and the reference frequency domain position, a candidate PDCCH resource that is not allocated to another terminal device and that has a minimum distance as the PDCCH resource to be allocated to the terminal device in the one or more candidate PDCCH resources of the terminal device.

Figure 9:
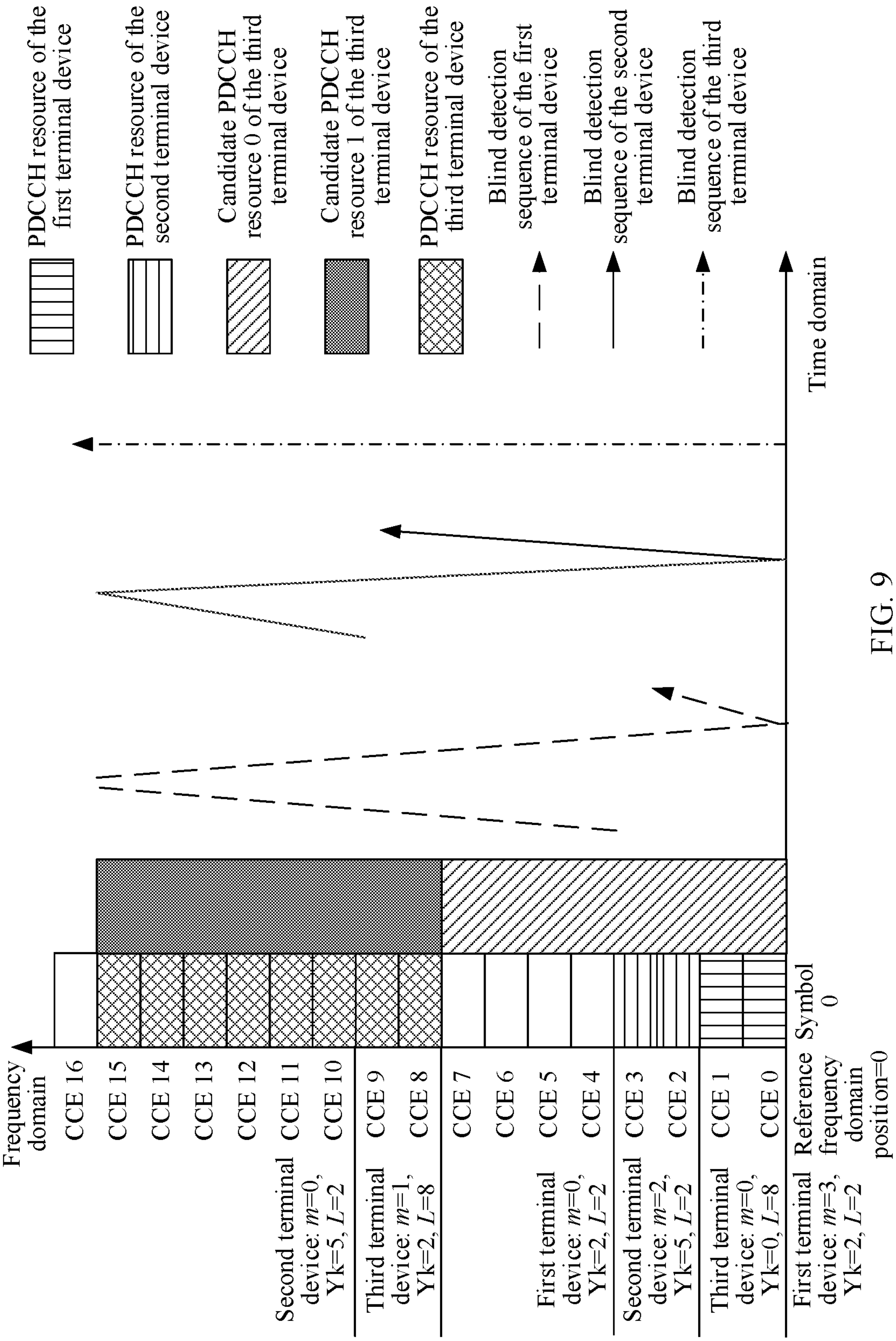
FIG. 9 is a schematic diagram of a centralized PDCCH resource allocation result according to an embodiment of this application.

For ease of understanding, with reference to FIG. 9, the following describes how the network device determines, based on the distance between the frequency domain position of the candidate PDCCH resource and the reference frequency domain position, the PDCCH resource to be allocated to the terminal device.

For example, as shown in FIG. 9 (where in FIG. 9, Yk is a randomization parameter $$Y_{p,n^{\mu}_{s,f}},$$

m is an index $m_{s,n_{CI}}$, and L is an aggregation level), it is assumed that a PDCCH time-frequency resource range indicated by a control resource set of which an index is p includes 17 candidate CCE resources in total: a CCE 0 to a CCE 16. The 17 candidate CCE resources are located in a symbol 0 in time domain, and have a same time domain position. A first terminal device and a second terminal device access a same cell, and both perform blind detection on a PDCCH resource in the PDCCH time-frequency resource range indicated by the control resource set. A randomization parameter $$Y_{p,n^{\mu}_{s,f}}$$

of the first terminal device is 2, an aggregation level L is 2, and a maximum quantity $$M^{(L)}_{s,max}$$

of blind detection times is 4. A randomization parameter $$Y_{p,n^{\mu}_{s,f}}$$

of the second terminal device is 5, an aggregation level L is 2, and a maximum quantity $$M^{(L)}_{s,max}$$

of blind detection times is 4. An index $n_{CI}$ of the cell accessed by the first terminal device and the second terminal device is 0.

$$N^{start}_{CCE,p}$$

represents a reference frequency domain position. As shown in FIG. 9, the reference frequency domain position is a frequency domain position corresponding to a start point of the CCE 0 in frequency domain (in a sequence from bottom to top of a frequency domain axis), and $$N_{CCE,p}^{start}=0$$

in frequency domain.

Each candidate PDCCH resource of the first terminal device and each candidate PDCCH resource of the second terminal device are determined based on the foregoing parameters and the first formula. FIG. 2 shows distribution of candidate PDCCH resources of the first terminal device and candidate PDCCH resources of the second terminal device. Neither the candidate PDCCH resources of the first terminal device nor the candidate PDCCH resources of the second terminal device are occupied, that is, both candidate PDCCH resources are in an allocatable state.

A start point of the candidate PDCCH resource in frequency domain (in the sequence from bottom to top of the frequency domain axis) is used as the frequency domain position of the candidate PDCCH resource. Based on the frequency domain position and the reference frequency domain position of each candidate PDCCH resource of the first terminal device, a candidate PDCCH resource that has a minimum distance between a frequency domain position and the reference frequency domain position, or in other words, a candidate PDCCH resource that is closest to the reference frequency domain position and of which an index $m_{s,n_{CI}}$ is 3 can be obtained. The candidate PDCCH resource includes the CCE 0 and the CCE 1, and is used as a PDCCH resource allocated to the first terminal device.

Correspondingly, a start point of the candidate PDCCH resource in frequency domain (in the sequence from bottom to top of the frequency domain axis) is used as the frequency domain position of the candidate PDCCH resource. Based on the frequency domain position and the reference frequency domain position of each candidate PDCCH resource of the second terminal device, a candidate PDCCH resource that has a minimum distance between a frequency domain position and the reference frequency domain position, or in other words, a candidate PDCCH resource that is closest to the reference frequency domain position and of which an index $m_{s,n_{CI}}$ is 2 can be obtained. The candidate PDCCH resource includes the CCE 2 and the CCE 3, and is used as a PDCCH resource allocated to the second terminal device.

FIG. 9 shows a schematic diagram of distribution of the PDCCH resources allocated to the first terminal device and the PDCCH resources allocated to the second terminal device that are determined based on the foregoing procedure. When performing blind detection, the first terminal device and the second terminal device separately perform blind detection in the blind detection sequence shown in FIG. 9, until the PDCCH resources allocated to the first terminal device and the second terminal device are detected.

As shown in FIG. 9, based on this solution, the PDCCH resources of the first terminal device and the second terminal device may be centralized. Then, the network device allocates a PDCCH resource to a third terminal device, and the third terminal device also performs blind detection on the PDCCH resource in the PDCCH time-frequency resource range indicated by the control resource set of which the index is p. A randomization parameter $$Y_{p,n_{s,f}^{\mu}}$$

of the third terminal device is 0, an aggregation level L is 8, and a maximum quantity $$M_{s,max}^{(L)}$$

of blind detection times is 2. The third terminal device, the first terminal device, and the second terminal device access the same cell, and the index $n_{CI}$ of the cell is 0. The network device determines candidate PDCCH resources of the third terminal device based on the first formula and the foregoing parameters. A candidate PDCCH resource of which an index is 0 includes the CCE 0 to the CCE 7, and a candidate PDCCH resource of which an index is 1 includes the CCE 8 to the CCE 15. Because the CCE 0 to the CCE 3 are occupied by the first terminal device and the second terminal device, in the candidate PDCCH resources of the third terminal device, a candidate PDCCH resource in an allocatable state is the candidate PDCCH resource of which the index is 1, and the network device allocates the candidate PDCCH resource to the third terminal device.

Therefore, in the resource allocation method provided in embodiments of this application, a candidate PDCCH of which a frequency domain position is close to the reference frequency domain position may be preferentially selected from the candidate PDCCH resources of the terminal device to be allocated to the terminal device, so that PDCCH resources allocated to a plurality of terminal devices are more centralized. In this way, a PDCCH resource is successfully allocated to a terminal device with a high aggregation level, and a problem that PDCCH resource fragmentation is caused when a frequency domain position of the 1st candidate PDCCH resource is related only to the randomization parameter in a conventional technology, and as a result, the PDCCH resource cannot be allocated to the terminal device with the high aggregation level is avoided.

In the foregoing example scenario, neither the candidate PDCCH resource that is of the first terminal device and that has a minimum distance between the frequency domain position and the reference frequency domain position nor the candidate PDCCH resource that is of the second terminal device and that has a minimum distance between the frequency domain position and the reference frequency domain position is occupied. Therefore, the candidate PDCCH resource that is closest to the reference frequency domain position is allocated to the first terminal device or the second terminal device. However, in some scenarios, a candidate PDCCH resource that is closest to the reference frequency domain position of the terminal device is already occupied. In this scenario, that the network device determines a PDCCH resource, in an allocatable state, that has a minimum distance between a frequency domain position and the reference frequency domain position and that is in one or more candidate PDCCH resources of the terminal device includes: The network device determines each candidate PDCCH resource of the terminal device based on the first formula, determines a distance between a frequency domain position of each candidate PDCCH resource and the reference frequency domain position; and selects, from candidate PDCCH resources that are not allocated to another terminal device, a candidate PDCCH resource with a minimum distance as a PDCCH resource to be allocated to the terminal device. Alternatively, the network device determines each candidate PDCCH resource of the terminal device based on the first formula, and then determines a candidate PDCCH resource of which an index meets a second formula as a PDCCH resource to be allocated to the terminal device.

For an implementation in which, when a PDCCH resource that has a minimum distance between a frequency domain position and the reference frequency domain is occupied, the network device first determines a distance between a frequency domain position of each candidate PDCCH resource and the reference frequency domain position, and then selects, from candidate PDCCH resources that are not allocated to another terminal device, a candidate PDCCH resource with a minimum distance as the PDCCH resource to be allocated to the terminal device, refer to the foregoing descriptions. The following describes a solution in which the network device determines, based on the second formula, the candidate PDCCH resource of which the index satisfies the second formula as the PDCCH resource that is in an allocatable state and that has a minimum distance between the frequency domain position and the reference frequency domain position.

The second formula satisfies the following relationship:

$$m_{s.n_{CI},i}=\left(m_{s.n_{CI},i-1}+1\right)\bmod M_{s,Max}^{(L)};\qquad \text{Formula (2)}$$

$$m_{s.n_{CI},i}=\left(m_{s.n_{CI},i-1}-1\right)\bmod M_{s,Max}^{(L)};\qquad \text{Formula (3)}$$

$$m_{s.n_{CI},i}=\left(m_{s.n_{CI},i-1}+(-1)^{i}i\right)\bmod M_{s,Max}^{(L)};\ \text{or}\qquad \text{Formula (4)}$$

$$m_{s.n_{CI},i}=\left(m_{s.n_{CI},i-1}-(-1)^{i}i\right)\bmod M_{s,Max}^{(L)}.\qquad \text{Formula (5)}$$

In the foregoing formulas (2) to (5), $m_{s.n_{CI},i}$ represents an index of a PDCCH resource, in an allocatable state, that has a minimum distance between a frequency domain position and the reference frequency domain position and that is in one or more candidate PDCCH resources that satisfy the first formula, and i is a value in $$\{1,\ 2\ \ldots,\ M_{s,Max}^{(L)}-1\};$$

when i=1, $m_{s.n_{CI},i-1}=m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M_{s,Max}^{(L)}$$

represents a maximum quantity of blind detection times of the terminal device.

For example, the following uses an example in which the second formula satisfies the formula (2) to describe how to determine, based on the second formula, the PDCCH resource, in an allocatable state, that has a minimum distance between the frequency domain position and the reference frequency domain position and that is in the one or more candidate PDCCH resources that satisfy the first formula. It is assumed that the PDCCH time-frequency resource range indicated by the control resource set of which the index is p includes 17 candidate CCE resources in total: the CCE 0 to the CCE 16. The 17 candidate CCE resources are located in the symbol 0 in time domain, and have the same time domain position. The first terminal device performs blind detection on the PDCCH resource in the PDCCH time-frequency resource range indicated by the control resource set, where the randomization parameter $$Y_{p,n_{s,f}^{\mu}}$$

of the first terminal device is 2, the aggregation level L is 2, the maximum quantity $$M_{s,max}^{(L)}$$

of blind detection times is 4, and the reference frequency domain position $$N_{CCE,p}^{start}=0.$$

The candidate PDCCH resources that satisfy the first formula of the first terminal device include the candidate PDCCH resource of which the index $m_{s,n_{CI}}$ is 0, where the candidate PDCCH resource includes the CCE 4 and the CCE 5, the candidate PDCCH resource of which the index $m_{s,n_{CI}}$ is 1, where the candidate PDCCH resource includes the CCE 8 and the CCE 9, the candidate PDCCH resource of which the index $m_{s,n_{CI}}$ is 2, where the candidate PDCCH resource includes the CCE 12 and the CCE 13, and the candidate PDCCH resource of which the index $m_{s,n_{CI}}$ is 3, where the candidate PDCCH resource includes the CCE 0 and the CCE 1. The candidate PDCCH resource that is closest to $$N_{CCE,p}^{start}$$

is the candidate PDCCH resource of which the index $m_{s,n_{CI}}$ is 3, but the candidate PDCCH resource is already allocated to another terminal device and is in an unallocated state. Therefore, when $m_{s.n_{CI},i-1}=m_{s.n_{CI},0}$, a value of $m_{s,n_{CI},0}$ is 3, and a value of i is 1. The values of the foregoing parameters are substituted into the formula (2), and it can be obtained that $m_{s.n_{CI},1}$=(3+1)mod 4, and $m_{s.n_{CI},1}$=0. Therefore, the network device may use, based on the second formula, the candidate PDCCH resource of which the index $m_{s.n_{CI},1}$ is 0 and that includes the CCE 4 and the CCE 5 as the PDCCH resource that is in an allocatable state and that has a minimum distance between the frequency domain position and the reference frequency domain position.

Based on the resource allocation method provided in embodiments of this application, when the PDCCH resource that has a minimum distance between the frequency domain position and the reference frequency domain position is occupied, the network device may determine the PDCCH resource that is in an allocatable state and has a minimum distance between a frequency domain position and the reference frequency domain position and allocate the PDCCH resource to the terminal device based on the second formula, so that when the PDCCH resource that has a minimum distance between the frequency domain position and the reference frequency domain position is occupied, an effect that the PDCCH resources allocated to a plurality of terminal devices are more centralized can still be implemented.

Optionally, in embodiments of this application, if reference frequency domain positions in different control resource sets are the same, PDCCH resources of terminal devices accessing different cells are concentrated at the same reference frequency domain position, so that inter-cell interference is increased. Therefore, optionally, embodiments of this application further provides the following method for determining the reference frequency domain position, to implement that the terminal devices accessing different cells correspond to different reference frequency domain positions, to reduce the inter-cell interference.

The method includes: determining the reference frequency domain position based on an identifier of the cell accessed by the terminal device and a third formula. When the identifier of the cell accessed by the terminal device satisfies the following relationship:

$$(\mathrm{PCI}+k) \bmod n = m \qquad \text{Formula (6), and}$$

the third formula satisfies the following relationship:

$$N_{CCE,p,m}^{start} = m \times \lfloor N_{CCE,p}/n \rfloor. \qquad \text{Formula (7)}$$

PCI represents the identifier of the cell accessed by the terminal device; k is a positive integer greater than or equal to 0; n is a value in $\{1, \ldots, N_{CCE,p}\}$; $N_{CCE,p}$ represents a quantity of CCE resources included in the PDCCH time-frequency resource range indicated by the control resource set of which the index is p, and the control resource set of which the index is p is a control resource set configured by the network device for the terminal device; m is a positive integer, and $0 \le m \le n-1$; and $$N_{CCE,p,m}^{start}$$

represents an index of a CCE resource corresponding to the reference frequency domain position.

The PCI in the formula (7) may be a physical cell identifier (PCI) of the cell accessed by the terminal device, and the network device may determine the PCI based on the cell accessed by the terminal device. A specific determining manner is not limited in this application.

Specifically, set values of k and n and a determined value of the PCI are substituted into the formula (6) to calculate m, and then a calculated value of m, and the values of $N_{CCE,p}$ and n are substituted into the formula (7) to calculate $$N_{CCE,p,m}^{start},$$

where $$N_{CCE,p,m}^{start}$$

in the index of the CCE resource corresponding to the determined reference frequency domain position.

Figure 10:
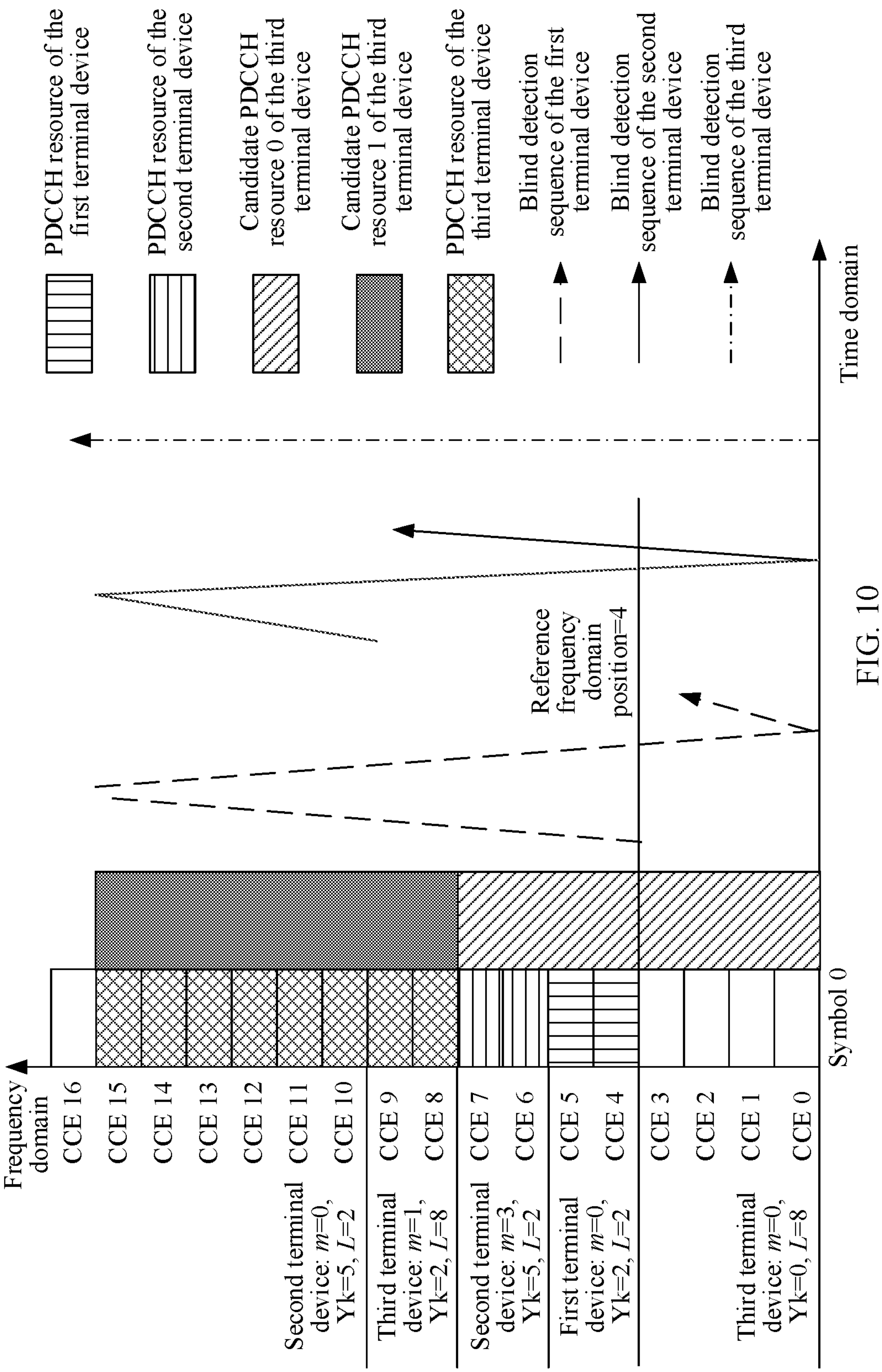
FIG. 10 is a schematic diagram of another centralized PDCCH resource allocation result according to an embodiment of this application.

For example, with reference to FIG. 10, the following describes a solution of determining a reference frequency domain position based on an identifier of a cell accessed by a terminal device and a third formula. As shown in FIG. 10 (where in FIG. 10, Yk is a randomization parameter $$Y_{p,n_{s,f}^{\mu}},$$

m is an index $m_{s,n_{CI}}$, and L is an aggregation level), it is assumed that a PCI of a cell accessed by a first terminal device, a second terminal device, and a third terminal device is 1, and the first terminal device, the second terminal device, and the third terminal device perform blind detection on a PDCCH resource in a PDCCH time-frequency resource range indicated by a control resource set of which an index is p, where the PDCCH time-frequency resource range indicated by the control resource set includes 17 candidate CCE resources: a CCE 0 to a CCE 16. If n=4 and k=0 are set, and values of related parameters are substituted into the formula (6), m=1 is obtained through calculation. Then, m=1, $N_{CCE,p}$=17, and n=4 are substituted into the formula (7), and $$N_{CCE,p,m}^{start} = 4$$

is obtained through calculation. Therefore, an index of a CCE resource corresponding to the determined reference frequency domain position is 4.

It should be noted that, in embodiments of this application, after the CCE resource corresponding to the reference frequency domain position is determined based on the index of the CCE resource corresponding to the reference frequency domain position, the reference frequency domain position includes a frequency domain position corresponding to any point in a frequency domain segment occupied by the CCE resource, for example, a frequency domain location of one end of two ends or a frequency domain position of a middle point. This is not limited in embodiments of this application.

A start point (in a sequence from bottom to top of a frequency domain axis) of the CCE resource in frequency domain is used as the reference frequency domain position. It is assumed that a randomization parameter $$Y_{p,n_{s,f}^{\mu}}$$

of the first terminal device is 2, an aggregation level L is 2, a maximum quantity $$M_{s,max}^{(L)}$$

of blind detection times is 4, and a randomization parameter $$Y_{p,n_{s,f}^{\mu}}$$

of the second terminal device is 5, an aggregation level L is 2, a maximum quantity $$M_{s,max}^{(L)}$$

of blind detection times is 4, and a randomization parameter $$Y_{p,n^{\mu}_{s,f}}$$

of the third terminal device is 0, an aggregation level L is 8, a maximum quantity $$M^{(L)}_{s,max}$$

of blind detection times is 2, and an index $n_{CI}$ of the cell accessed by the first terminal device, the second terminal device, and the third terminal device is 0. With reference to the foregoing parameters and the foregoing described method for determining the PDCCH resource allocated to the terminal device based on the reference frequency domain position, the PDCCH resources allocated to the first terminal device, the second terminal device, and the third terminal device are determined. An allocation result of the PDCCH resources is shown in FIG. 10.

Embodiment 2: The following describes the embodiment 2 by using an example in which a network device interacts with at least two terminal devices. When the network device allocates PDCCH resources to the at least two terminal devices, a distance between frequency domain positions of two PDCCH resources that are adjacent in frequency domain in the allocated at least two PDCCH resources meets a preset condition. Therefore, in the resource allocation method provided in embodiments of this application, a distance between a frequency domain position of the PDCCH resource allocated by the network device to the terminal device and an adjacent PDCCH resource allocated to another terminal device meets a preset condition, so that frequency domain position distribution of the PDCCH resources is not randomized, and a probability of a problem of PDCCH resource fragmentation is reduced.

In embodiments of this application, that a distance between frequency domain positions of two PDCCH resources that are adjacent in frequency domain in the at least two PDCCH resources meets a preset condition includes:

The two adjacent PDCCH resources include a first PDCCH resource and a second PDCCH resource, and the second PDCCH resource is a PDCCH resource, in an allocatable state, that has a minimum distance from the first PDCCH resource and that is in one or more candidate PDCCH resources that satisfy the first formula. The second PDCCH resource is a PDCCH resource that is selected by the network device from one or more candidate PDCCH resources of the terminal device and that is to be allocated to the terminal device, and the first PDCCH resource is a PDCCH resource that is already allocated to any remaining terminal device before the network device allocates the second PDCCH resource to the terminal device.

For related descriptions of the first formula and how to determine the candidate PDCCH resource of the terminal device based on the first formula, refer to the foregoing descriptions of the formula (1). Details are not described herein again.

Specifically, after determining each candidate PDCCH resource of the terminal device based on the first formula, the network device selects, based on a frequency domain position of each candidate PDCCH resource, a candidate PDCCH resource that has a minimum distance between a frequency domain position and a frequency domain position of the first PDCCH resource from candidate PDCCH resources that are in an allocatable state as the PDCCH resource to be allocated to the terminal device. For descriptions of how to determine the candidate PDCCH resource based on the first formula, refer to the foregoing descriptions. Details are not described herein again.

Based on the resource allocation method provided in embodiments of this application, a candidate PDCCH resource of which a frequency domain position is closest to another PDCCH resource may be preferentially selected from the candidate PDCCH resources of the terminal device to be allocated to the terminal device, so that PDCCH resources allocated to a plurality of terminal devices are more centralized. In this way, a PDCCH resource is successfully allocated to a terminal device with a high aggregation level, and a problem that PDCCH resource fragmentation is caused when a frequency domain position of the $1^{st}$ candidate PDCCH resource is related only to the randomization parameter in a conventional technology, and as a result the PDCCH resource cannot be allocated to the terminal device with the high aggregation level is avoided.

The following describes step S802. After determining the at least two PDCCH resources allocated to the at least two terminal devices, the network device respectively sends information to each terminal device on each PDCCH resource. Correspondingly, after blindly detecting the PDCCH resource allocated to the terminal device in a blind detection sequence, the terminal device may successfully check and receive the information sent by the network device on the PDCCH resource. After the terminal device successfully checks the information sent by the network device on the PDCCH resource, the terminal device may determine, based on a check result, that the PDCCH resource is the PDCCH resource allocated by the network device to the terminal device, and stop the blind detection. Optionally, the information sent by the network device on the PDCCH resource may be downlink control information (DCI). A manner in which the terminal device checks the information is not limited in this application.

Application of the resource allocation method provided in embodiments of this application may increase a quantity of blind detection times when the terminal device performs blind detection may. Therefore, optionally, the resource allocation method provided in embodiments of this application may be applied when a cell accessed by the at least two terminal devices meets the following condition:

In a target periodicity, utilization of a CCE resource is greater than a first threshold corresponding to the target periodicity.

Specifically, in a preset target periodicity, if it is detected that in a PDCCH time-frequency resource range allocated by the network device to the cell accessed by the at least two terminal devices, the utilization of the CCE resource is greater than the first threshold corresponding to the target periodicity, for example, greater than A %, the resource allocation method provided in embodiments of this application is applied. The utilization of the CCE resource is a ratio of a quantity of CCE resources that are already allocated to the terminal device in the PDCCH time-frequency resource range corresponding to the cell to a total quantity of CCE resources.

Alternatively, in a target periodicity, a ratio of a quantity of first-type terminal devices accessing the cell to a quantity of second-type terminal devices accessing the cell is greater than a third threshold corresponding to the target periodicity, where the first-type terminal device is a terminal device to which a PDCCH resource is unsuccessfully allocated and of which an aggregation level is greater than a second threshold, and the second-type terminal device is a terminal device of which an aggregation level is greater than the second threshold and that requests scheduling. The network device needs to allocate a PDCCH resource to the terminal device that requests scheduling.

Specifically, in a preset target periodicity, if it is detected that proportion of terminal devices that access a cell with an aggregation level greater than the second threshold (for example, 8) and to which a PDCCH resource is unsuccessfully allocated, in terminal devices that access the cell with the aggregation level greater than the second threshold and that requests scheduling exceeds a third threshold corresponding to the target periodicity, for example, exceeds B %, the resource allocation method provided in embodiments of this application is applied.

If the foregoing condition is not met, the resource allocation method provided in embodiments of this application may not be applied, but another PDCCH resource allocation method may be applied (for example, the allocation method in the conventional technology described above). Based on this solution, whether a PDCCH resource fragmentation problem in a cell accessed by the terminal device is serious may be determined based on utilization of a candidate PDCCH resource or a probability that a PDCCH resource fails to be allocated to a terminal device with a high aggregation level. If the preset condition is met, it indicates that the PDCCH resource fragmentation problem is serious, and the resource allocation method provided in embodiments of this application needs to be applied to reduce the probability of the problem of PDCCH resource fragmentation, to further improve a success rate of PDCCH resource allocation. If the preset condition is not met, it indicates that the problem of PDCCH resource fragmentation is not serious, and the resource allocation method provided in embodiments of this application does not need to be applied.

Optionally, the target periodicity in the foregoing solution may be determined based on a load status corresponding to the cell accessed by the at least two terminal devices. The load status of the cell may be determined based on traffic volume of the terminal device accessing the cell or a quantity of terminal devices accessing the cell.

Different load statuses of the cell correspond to different target periodicities, and different target periodicities correspond to different first thresholds or different third thresholds. For example, when it is determined that the cell is in a "busy" state, the target periodicity is 1 s, a corresponding first threshold is A %, and a corresponding third threshold is B %. When it is determined that the cell is in an "idle" state, the target periodicity is 1 TTI, that is, 1 ms, a corresponding first threshold is C %, and a corresponding third threshold is D %. Optionally, a value relationship between different first thresholds or different third thresholds corresponding to different target periodicities may be set according to an actual requirement. For example, in the foregoing example, C % is set to be greater than A % and D % is set to be greater than B %. Based on this solution, different target periodicities and thresholds corresponding to the target periodicities may be determined based on load statuses of the cell in different scenarios, to meet different requirements.

The actions of the network device in steps S801 and S802 may be performed by the processor 601 in the network device 60 shown in FIG. 6 by invoking the application program code stored in the memory 602, to indicate the network device to perform the actions. The actions of the terminal device in steps S801 and S802 may be performed by the processor 701 in the terminal device 70 shown in FIG. 6 by invoking the application program code stored in the memory 702, to indicate the terminal device to perform the actions. This is not limited in embodiments.

It may be understood that, in the foregoing embodiments, the methods and/or steps implemented by the network device may also be implemented by a component (for example, a chip or a circuit) that can be used in the network device, and the methods and/or steps implemented by the terminal device may also be implemented by a component (for example, a chip or a circuit) that can be used in the terminal device.

The foregoing mainly describes, from a perspective of interaction between devices, the solutions provided in embodiments of this application. Correspondingly, an embodiment of this application further provides a communication apparatus, and the communication apparatus is configured to implement the foregoing methods. The communication apparatus may be the network device in the foregoing method embodiments, or an apparatus including the foregoing network device, or a component that can be used in the network device. Alternatively, the communication apparatus may be the terminal device in the foregoing method embodiments, or an apparatus including the foregoing terminal device, or a component that can be used in the terminal device. It may be understood that, to implement the foregoing functions, the communication apparatus includes a corresponding hardware structure and/or a corresponding software module for performing each function. A person skilled in the art should easily be aware that units and algorithm steps in the examples described with reference to embodiments disclosed in this specification can be implemented by hardware or a combination of hardware and computer software in this application. Whether a function is executed in a manner of hardware or hardware driven by computer software depends on applications and design constraints of the technical solutions. A person skilled in the art may use different methods to implement the described functions for each application. However, it should not be considered that the implementation goes beyond the scope of embodiments of this application.

In embodiments of this application, functional module division may be performed on the communication apparatus based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that the module division in embodiments of this application is an example, and is merely logical function division. In an actual implementation, there may be another division manner.

Figure 11:
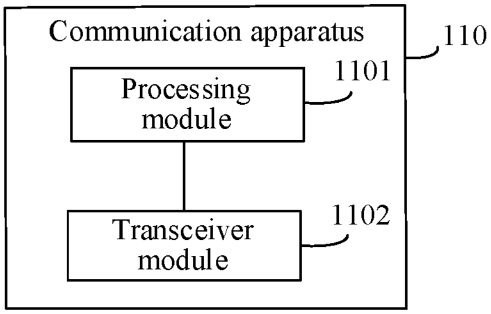
FIG. 11 is a schematic diagram of a structure of a communication apparatus according to an embodiment of this application.

That the communication apparatus is the network device in the foregoing method embodiments is used as an example. FIG. 11 is a schematic diagram of a structure of a communication apparatus 110. The communication apparatus 110 includes a processing module 1101 and a transceiver module 1102. The transceiver module 1102 may also be referred to as a transceiver unit, and is configured to implement a transceiver function. For example, the transceiver module 1102 may be a transceiver circuit, a transceiver, a transceiver machine, or a communication interface.

The processing module 1101 is configured to determine at least two physical downlink control channel PDCCH resources for at least two terminal devices, where the at least two PDCCH resources are in a one-to-one correspondence with the at least two terminal devices, and a distance between a frequency domain position of each of the at least two PDCCH resources and a reference frequency domain position meets a preset condition, or a distance between frequency domain positions of two PDCCH resources that are adjacent in frequency domain in the at least two PDCCH resources meets a preset condition. The transceiver module 1102 is configured to respectively send information to the at least two terminal devices on the at least two PDCCH resources.

Optionally, that a distance between a frequency domain position of each of the at least two PDCCH resources and a reference frequency domain position meets a preset condition includes: Each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,$$

where L represents an aggregation level of a terminal device corresponding to the one or more candidate PDCCH resources;

$$Y_{p,n^{\mu}_{s,f}}$$

represents a randomization parameter corresponding to the terminal device; $N_{CCE,p}$ represents a quantity of control channel element CCE resources included in a PDCCH time-frequency resource range indicated by a control resource set of which an index is p, and the control resource set of which the index is p is a control resource set configured by the communication apparatus for the terminal device;

$$M^{(L)}_{s,max}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M^{(L)}_{s,Max}-1\};$$

$n_{CI}$ represents an index of a cell accessed by the terminal device; and i={0, 1, . . . , L−1}.

Optionally, that each of the at least two PDCCH resources is a PDCCH resource, in an allocatable state, that has a minimum distance between a frequency domain position and the reference frequency domain position and that is in one or more candidate PDCCH resources that meet a first formula includes: When a PDCCH resource that has a minimum distance between a frequency domain position and the reference frequency domain position in the one or more candidate PDCCH resources that satisfy the first formula is occupied, each of the at least two PDCCH resources is a PDCCH resource of which an index meets a second formula, where the second formula satisfies the following relationship:

$$m_{s,n_{CI},i}=\left(m_{s,n_{CI},i-1}+1\right)\bmod M^{(L)}_{s,Max};$$

$$m_{s,n_{CI},i}=\left(m_{s,n_{CI},i-1}-1\right)\bmod M^{(L)}_{s,Max};$$

$$m_{s,n_{CI},i}=\left(m_{s,n_{CI},i-1}+(-1)^{i}i\right)\bmod M^{(L)}_{s,Max};\text{ or}$$

$$m_{s,n_{CI},i}=\left(m_{s,n_{CI},i-1}-(-1)^{i}i\right)\bmod M^{(L)}_{s,Max},$$

where $m_{s,n_{CI},i}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1, 2\ \ldots, M^{(L)}_{s,Max}-1\}$$

when i=1, $m_{s,n_{CI},i-1}=m_{s,n_{CI},0}$, and $m_{s,n_{CI},0}$ represents an index of the PDCCH resource that has a minimum distance between the frequency domain position and the reference frequency domain position in the one or more candidate PDCCH resources that satisfy the first formula; and $$M^{(L)}_{s,Max}$$

represents the maximum quantity of blind detection times of the terminal device.

Optionally, the reference frequency domain position is determined based on an identifier of a cell accessed by the at least two terminal devices and a third formula; and when the identifier of the cell accessed by the terminal device satisfies the following relationship: (PCI+k)mod n=m, the third formula satisfies the following relationship:

$$N^{start}_{CCE,p,m}=m\times\lfloor N_{CCE,p}/n\rfloor,$$

where PCI represents the identifier of the cell accessed by the terminal device; k is a positive integer greater than or equal to 0; n is a value in {1, . . . , $N_{CCE,p}$}; $N_{CCE,p}$ represents the quantity of CCE resources included in the PDCCH time-frequency resource range indicated by the control resource set of which the index is p, and the control resource set of which the index is p is the control resource set configured by the communication apparatus for the terminal device; m is a positive integer, and 0≤m≤n−1; and $$N^{start}_{CCE,p,m}$$

represents an index of a CCE resource corresponding to the reference frequency domain position.

Optionally, that a distance between frequency domain positions of two PDCCH resources that are adjacent in frequency domain in the at least two PDCCH resources meets a preset condition includes: The two adjacent PDCCH resources include a first PDCCH resource and a second PDCCH resource, and the second PDCCH resource is a PDCCH resource, in an allocatable state, that has a minimum distance from the first PDCCH resource and that is in one or more candidate PDCCH resources that satisfy the first formula; and the first formula satisfies the following relationship: where $$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,$$

L represents an aggregation level of a terminal device corresponding to the one or more candidate PDCCH resources;

$$Y_{p,n^{\mu}_{s,f}}$$

represents a randomization parameter corresponding to the terminal device; $N_{CCE,p}$ represents a quantity of CCE resources included in a PDCCH time-frequency resource range indicated by a control resource set of which an index is p, and the control resource set of which the index is p is a control resource set configured by the communication apparatus for the terminal device;

$$M^{(L)}_{s,max}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0,1,\ldots,M^{(L)}_{s,max}-1\};$$

$n_{CI}$ represents an index of a cell accessed by the terminal device; and i={0, 1, . . . , L−1}.

Optionally, the cell accessed by the at least two terminal devices meets the following condition: in a target periodicity, utilization of the CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, where the first-type terminal device is a terminal device to which a PDCCH resource is unsuccessfully allocated and of which an aggregation level is greater than a second threshold, and the second-type terminal device is a terminal device of which an aggregation level is greater than the second threshold and that requests scheduling.

Optionally, the target periodicity is determined based on a load status corresponding to the cell accessed by the at least two terminal devices.

All related content of the steps in the foregoing method embodiments may be cited in function descriptions of the corresponding functional modules. Details are not described herein again.

In embodiments, the communication apparatus 110 is presented in a form of functional modules obtained through division in an integrated manner. The "module" herein may be an ASIC, a circuit, a processor that executes one or more software or firmware programs, a memory, an integrated logic circuit, and/or another component that can provide the foregoing functions.

In a simple embodiment, a person skilled in the art may figure out that the communication apparatus 110 may be in a form of the network device 60 shown in FIG. 6.

For example, the processor 601 in the network device 60 shown in FIG. 6 may invoke the computer-executable instructions stored in the memory 602, to enable the network device 60 to perform the resource allocation method in the foregoing method embodiments. Specifically, functions/implementation processes of the processing module 1101 and the transceiver module 1102 in FIG. 11 may be implemented by the processor 601 in the network device 60 shown in FIG. 6 by invoking the computer-executable instructions stored in the memory 602. Alternatively, a function/an implementation process of the processing module 1101 in FIG. 11 may be implemented by the processor 601 in the network device 60 shown in FIG. 6 by invoking the computer-executable instructions stored in the memory 602, and a function/an implementation process of the transceiver module 1102 in FIG. 11 may be implemented by the transceiver 603 in the network device 60 shown in FIG. 6.

Because the communication apparatus 110 provided in embodiments may perform the foregoing resource allocation method, for a technical effect that can be achieved by the communication apparatus 110, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of computer program instructions and is stored in a memory. The processor may be configured to execute the program instructions and implement the foregoing method procedures. The processor may be built into a system on a chip (SoC) or an ASIC, or may be an independent semiconductor chip. In addition to a core for executing software instructions to perform operations or processing, the processor may further include a necessary hardware accelerator, such as a field programmable gate array (FPGA), a programmable logic device (PLD), or a logic circuit that implements a dedicated logic operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system. The chip system includes at least one processor and an interface. The at least one processor is coupled to a memory through the interface. When the at least one processor executes a computer program or instructions in the memory, the method according to any one of the foregoing method embodiments is performed. In a possible implementation, the communication apparatus further includes a memory. Optionally, the chip system may include a chip, or may include a chip and another discrete component. This is not limited in embodiments of this application.

All or some of the foregoing embodiments may be implemented through software, hardware, firmware, or any combination thereof. When a software program is used for implementation, all or some of the foregoing embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device that is integrated by one or more usable media, such as a server or a data center. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the accompanying claims. In the claims, the term "comprise" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to features and embodiments thereof, various modifications and combinations may be made to them without departing from the spirit and scope of this application. Correspondingly, the specification and accompanying drawings are merely descriptions of examples of this application defined by the accompanying claims, and are considered as any of or all modifications, variations, combinations or equivalents that cover the scope of this application. A person skilled in the art could make various modifications and variations to this application without departing from the spirit and scope of this application. This application is intended to cover these modifications and variations provided that they fall within the scope of claims of this application and equivalent technologies thereof.

What is claimed is:

1. A resource allocation method, wherein the method comprises:

determining at least two physical downlink control channel (PDCCH) resources for at least two terminal devices, wherein the at least two PDCCH resources are in a one-to-one correspondence with the at least two terminal devices, and a distance between a frequency domain position of each of the at least two PDCCH resources and a reference frequency domain position meets a preset condition, wherein the reference frequency domain position is determined based on an identifier of a cell accessed by the at least two terminal devices; and respectively sending information to the at least two terminal devices on the at least two PDCCH resources.

2. The method according to claim 1, wherein that a distance between a frequency domain position of each of the at least two PDCCH resources and a reference frequency domain position meets a preset condition comprises:

each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,$$

wherein

L represents an aggregation level of a terminal device corresponding to the one or more candidate PDCCH resources;

$$Y_{p,n^{\mu}_{s,f}}$$

represents a randomization parameter corresponding to the terminal device; $N_{CCE,p}$ represents a quantity of control channel element (CCE) resources comprised in a PDCCH time-frequency resource range indicated by a control resource set of which an index is p, and the control resource set of which the index is p is a control resource set configured by a network device for the terminal device;

$$M^{(L)}_{s,max}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M^{(L)}_{s,max}-1\};$$

$n_{CI}$ represents an index of a cell accessed by the terminal device; and i={0, 1, . . . , L−1}.

3. The method according to claim 2, wherein that each of the at least two PDCCH resources is a PDCCH resource, in an allocatable state, that has a minimum distance between a frequency domain position and the reference frequency domain position and that is in one or more candidate PDCCH resources that satisfy a first formula comprises:

when a PDCCH resource that has a minimum distance between a frequency domain position and the reference frequency domain position in the one or more candidate PDCCH resources that satisfy the first formula is occupied, each of the at least two PDCCH resources is a PDCCH resource of which an index satisfies a second formula, wherein the second formula satisfies the following relationship:

$$m_{s.n_{CI},i}=(m_{s.n_{CI},i-1}+1)\bmod M_{s,Max}^{(L)};$$

$$m_{s.n_{CI},i}=(m_{s.n_{CI},i-1}-1)\bmod M_{s,Max}^{(L)};$$

$$m_{s.n_{CI},i}=(m_{s.n_{CI},i-1}+(-1)^{i}i)\bmod M_{s,Max}^{(L)};\text{ or}$$

$$m_{s.n_{CI},i}=(m_{s.n_{CI},i-1}-(-1)^{i}i)\bmod M_{s,Max}^{(L)},\text{ wherein}$$

$m_{s.n_{CI},i}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1,2\ \ldots\ ,M_{s,Max}^{(L)}-1\}$$

when i=1, $m_{s.n_{CI},i-1}=m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M_{s,Max}^{(L)}$$

represents the maximum quantity of blind detection times of the terminal device.

4. The method according to claim 1, wherein the reference frequency domain position is determined based on the identifier of the cell accessed by the at least two terminal devices and a third formula; and when the identifier of the cell accessed by the terminal device satisfies the following relationship:

$$(PCI+k)\bmod n=m,$$

the third formula satisfies the following relationship:

$$N_{CCE,p,m}^{start}=m\times\lfloor N_{CCE,p}/n\rfloor,$$

wherein

PCI represents the identifier of the cell accessed by the terminal device; k is a positive integer greater than or equal to 0; n is a value in $\{1, \ldots, N_{CCE,p}\}$; $N_{CCE,p}$ represents the quantity of CCE resources comprised in the PDCCH time-frequency resource range indicated by the control resource set of which the index is p, and the control resource set of which the index is p is the control resource set configured by the network device for the terminal device; m is a positive integer, and $0\leq m\leq n-1$; and $$N_{CCE,p,m}^{start}$$

represents an index of a CCE resource corresponding to the reference frequency domain position.

5. The method according to claim 1, wherein a cell accessed by the at least two terminal devices meets the following condition:

in a target periodicity, utilization of a CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, wherein a first-type terminal device in the quantity of first-type terminal devices is a terminal device to which a PDCCH resource is unsuccessfully allocated and of which an aggregation level is greater than a second threshold, and a second-type terminal device in the quantity of second-type terminal devices is a terminal device of which an aggregation level is greater than the second threshold and that requests scheduling.

6. The method according to claim 5, wherein the target periodicity is determined based on a load status corresponding to the cell accessed by the at least two terminal devices.

7. An apparatus, comprising:

a processor and a memory, wherein the memory is configured to store a computer program, and the processor is configured to run the computer program stored in the memory, wherein the computer program instructs the processor to: determine at least two physical downlink control channel (PDCCH) resources for at least two terminal devices, wherein the at least two PDCCH resources are in a one-to-one correspondence with the at least two terminal devices, and a distance between a frequency domain position of each of the at least two PDCCH resources and a reference frequency domain position meets a preset condition, wherein the reference frequency domain position is determined based on an identifier of a cell accessed by the at least two terminal devices; and respectively send information to the at least two terminal devices on the at least two PDCCH resources.

8. The apparatus according to claim 7, wherein that a distance between a frequency domain position of each of the at least two PDCCH resources and a reference frequency domain position meets a preset condition comprises:

each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i,$$

wherein

L represents an aggregation level of a terminal device corresponding to the one or more candidate PDCCH resources;

$$Y_{p,n_{s,f}^{\mu}}$$

represents a randomization parameter corresponding to the terminal device; $N_{CCE,p}$ represents a quantity of control channel element (CCE) resources comprised in a PDCCH time-frequency resource range indicated by a control resource set of which an index is p, and the control resource set of which the index is p is a control resource set configured by the apparatus for the terminal device;

$$M_{s,max}^{(L)}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M_{s,max}^{(L)} - 1\};$$

$n_{CI}$ represents an index of a cell accessed by the terminal device; and i={0, 1, . . . , L−1}.

9. The apparatus according to claim 8, wherein that each of the at least two PDCCH resources is a PDCCH resource, in an allocatable state, that has a minimum distance between a frequency domain position and the reference frequency domain position and that is in one or more candidate PDCCH resources that satisfy a first formula comprises:

when a PDCCH resource that has a minimum distance between a frequency domain position and the reference frequency domain position in the one or more candidate PDCCH resources that satisfy the first formula is occupied, each of the at least two PDCCH resources is a PDCCH resource of which an index satisfies a second formula, wherein the second formula satisfies the following relationship:

$$m_{s.n_{CI},i} = (m_{s.n_{CI},i-1} + 1) \bmod M_{s,Max}^{(L)};$$

$$m_{s.n_{CI},i} = (m_{s.n_{CI},i-1} - 1) \bmod M_{s,Max}^{(L)};$$

$$m_{s.n_{CI},i} = (m_{s.n_{CI},i-1} + (-1)^i i) \bmod M_{s,Max}^{(L)}; \text{ or}$$

$$m_{s.n_{CI},i} = (m_{s.n_{CI},i-1} - (-1)^i i) \bmod M_{s,Max}^{(L)}; \text{ wherein}$$

$m_{s.n_{CI}}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1, 2 \ldots, M_{s,Max}^{(L)} - 1\};$$

when i=1, $m_{s.n_{CI},i-1} = m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M_{s,Max}^{(L)}$$

represents the maximum quantity of blind detection times of the terminal device.

10. The apparatus according to claim 7, wherein the reference frequency domain position is determined based on the identifier of the cell accessed by the at least two terminal devices and a third formula; and when the identifier of the cell accessed by the terminal device satisfies the following relationship:

$$(\mathrm{PCI}+k) \bmod n = m,$$

$$N_{CCE,p,m}^{start} = m \times \lfloor N_{CCE,p}/n \rfloor,$$

wherein

PCI represents the identifier of the cell accessed by the terminal device; k is a positive integer greater than or equal to 0; n is a value in {1, . . . , $N_{CCE,p}$}; $N_{CCE,p}$ represents the quantity of CCE resources comprised in the PDCCH time-frequency resource range indicated by the control resource set of which the index is p, and the control resource set of which the index is p is the control resource set configured by the apparatus for the terminal device; m is a positive integer, and 0≤m≤n−1; and $$N_{CCE,p,m}^{start}$$

represents an index of a CCE resource corresponding to the reference frequency domain position.

11. The apparatus according to claim 7, wherein a cell accessed by the at least two terminal devices meets the following condition:

in a target periodicity, utilization of a CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, wherein a first-type terminal device in the quantity of first-type terminal devices is a terminal device to which a PDCCH resource is unsuccessfully allocated and of which an aggregation level is greater than a second threshold, and a second-type terminal device in the quantity of second-type terminal devices is a terminal device of which an aggregation level is greater than the second threshold and that requests scheduling.

12. The apparatus according to claim 11, wherein the target periodicity is determined based on a load status corresponding to the cell accessed by the at least two terminal devices.

13. A non-transitory computer-readable storage medium storing instructions which when executed cause an apparatus to:

determine at least two physical downlink control channel (PDCCH) resources for at least two terminal devices, wherein the at least two PDCCH resources are in a one-to-one correspondence with the at least two terminal devices, and a distance between a frequency domain position of each of the at least two PDCCH resources and a reference frequency domain position meets a preset condition, wherein the reference frequency domain position is determined based on an identifier of a cell accessed by the at least two terminal devices; and respectively send information to the at least two terminal devices on the at least two PDCCH resources.

14. The non-transitory computer-readable storage medium according to claim 13, wherein that a distance between a frequency domain position of each of the at least two PDCCH resources and a reference frequency domain position meets a preset condition comprises:

each of the at least two PDCCH resources is a PDCCH resource, in an allocatable state, that has a minimum distance between a frequency domain position and the reference frequency domain position and that is in one or more candidate PDCCH resources that satisfy a first formula; and the first formula satisfies the following relationship:

$$L \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \bmod \lfloor N_{CCE,p}/L \rfloor \right\} + i,$$

wherein

L represents an aggregation level of a terminal device corresponding to the one or more candidate PDCCH resources;

$$Y_{p,n^{\mu}_{s,f}}$$

represents a randomization parameter corresponding to the terminal device; $N_{CCE,p}$ represents a quantity of control channel element (CCE) resources comprised in a PDCCH time-frequency resource range indicated by a control resource set of which an index is p, and the control resource set of which the index is p is a control resource set configured by a network device for the terminal device;

$$M^{(L)}_{s,max}$$

represents a maximum quantity of blind detection times of the terminal device; $m_{s,n_{CI}}$ represents an index of each candidate PDCCH resource in the one or more candidate PDCCH resources, and $m_{s,n_{CI}}$ is a value in $$\{0, 1, \ldots, M^{(L)}_{s,max} - 1\};$$

$n_{CI}$ represents an index of a cell accessed by the terminal device; and i={0, 1, . . . , L−1}.

15. The non-transitory computer-readable storage medium according to claim 14, wherein that each of the at least two PDCCH resources is a PDCCH resource, in an allocatable state, that has a minimum distance between a frequency domain position and the reference frequency domain position and that is in one or more candidate PDCCH resources that satisfy a first formula comprises:

when a PDCCH resource that has a minimum distance between a frequency domain position and the reference frequency domain position in the one or more candidate PDCCH resources that satisfy the first formula is occupied, each of the at least two PDCCH resources is a PDCCH resource of which an index satisfies a second formula, wherein the second formula satisfies the following relationship:

$$m_{s.n_{CI},i} = (m_{s.n_{CI},i-1} + 1) \bmod M^{(L)}_{s,Max};$$

$$m_{s.n_{CI},i} = (m_{s.n_{CI},i-1} - 1) \bmod M^{(L)}_{s,Max};$$

$$m_{s.n_{CI},i} = (m_{s.n_{CI},i-1} + (-1)^i i) \bmod M^{(L)}_{s,Max}; \text{ or}$$

$$m_{s.n_{CI},i} = (m_{s.n_{CI},i-1} - (-1)^i i) \bmod M^{(L)}_{s,Max}; \text{ wherein}$$

$m_{s.n_{CI},i}$ represents an index of the PDCCH resource, in an allocatable state, that has a minimum distance between the frequency domain position and the reference frequency domain position and that is in the one or more candidate PDCCH resources that satisfy the first formula, and i is a value in $$\{1, 2 \ldots, M^{(L)}_{s,Max} - 1\};$$

when i=1, $m_{s.n_{CI},i-1}=m_{s.n_{CI},0}$, and $m_{s.n_{CI},0}$ represents an index of the PDCCH resource that has a minimum distance between the frequency domain position and the reference frequency domain position in the one or more candidate PDCCH resources that satisfy the first formula; and $$M^{(L)}_{s,Max}$$

represents the maximum quantity of blind detection times of the terminal device.

16. The non-transitory computer-readable storage medium according to claim 13, wherein the reference frequency domain position is determined based on the identifier of the cell accessed by the at least two terminal devices and a third formula; and when the identifier of the cell accessed by the terminal device satisfies the following relationship:

$$(PCI+k) \bmod n=m,$$

the third formula satisfies the following relationship:

$$N^{start}_{CCE,p,m} = m \times \lfloor N_{CCE,p}/n \rfloor,$$

wherein

PCI represents the identifier of the cell accessed by the terminal device; k is a positive integer greater than or equal to 0; n is a value in {1, . . . , $N_{CCE,p}$}; $N_{CCE,p}$ represents the quantity of CCE resources comprised in the PDCCH time-frequency resource range indicated by the control resource set of which the index is p, and the control resource set of which the index is p is the control resource set configured by the network device for the terminal device; m is a positive integer, and 0≤m≤n−1; and $$N_{CCE,p,m}^{start}$$

represents an index of a CCE resource corresponding to the reference frequency domain position.

17. The non-transitory computer-readable storage medium according to claim 13, wherein a cell accessed by the at least two terminal devices meets the following condition:

in a target periodicity, utilization of a CCE resource is greater than a first threshold corresponding to the target periodicity; or in a target periodicity, a ratio of a quantity of first-type terminal devices accessing the cell to a quantity of second-type terminal devices accessing the cell is greater than a third threshold corresponding to the target periodicity, wherein a first-type terminal device in the quantity of first-type terminal devices is a terminal device to which a PDCCH resource is unsuccessfully allocated and of which an aggregation level is greater than a second threshold, and a second-type terminal device in the quantity of second-type terminal devices is a terminal device of which an aggregation level is greater than the second threshold and that requests scheduling.

* * * * *